(12) United States Patent
Knockeart et al.

(10) Patent No.: US 6,621,452 B2
(45) Date of Patent: Sep. 16, 2003

(54) VEHICLE INFORMATION SYSTEM

(75) Inventors: Ronald P. Knockeart, Clarkston, MI (US); Bob Drury, Novi, MI (US); Melvin A. Rode, Orion, MI (US); Steven Brown, Sterling Heights, MI (US); Harry Asher, Garden City, MI (US); Paul A. Jozefowicz, Roseville, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 10/246,928

(22) Filed: Sep. 19, 2002

(65) Prior Publication Data

US 2003/0018428 A1 Jan. 23, 2003

Related U.S. Application Data

(63) Continuation of application No. 09/136,868, filed on Aug. 19, 1998.
(60) Provisional application No. 60/056,150, filed on Aug. 19, 1997.

(51) Int. Cl.⁷ .............................. G01S 5/02; H04B 7/85
(52) U.S. Cl. ........................ 342/357.09; 342/357.13; 701/214
(58) Field of Search ................... 342/357.09, 357.1, 342/357.07, 357.13; 701/214

(56) References Cited

U.S. PATENT DOCUMENTS

| | | |
|---|---|---|
| 4,733,356 A | 3/1988 | Haeussermann et al. |
| 4,796,191 A | 1/1989 | Honey et al. |
| 4,954,958 A | 9/1990 | Savage et al. |
| 5,025,261 A | 6/1991 | Ohta et al. |
| 5,031,223 A * | 7/1991 | Rosenbaum et al. |
| 5,043,902 A | 8/1991 | Yokoyama et al. |
| 5,072,395 A | 12/1991 | Bliss et al. |
| 5,172,321 A | 12/1992 | Ghaem et al. |
| 5,239,700 A | 8/1993 | Guenther et al. |
| 5,243,528 A | 9/1993 | Lefebvre |
| 5,278,759 A | 1/1994 | Berra et al. |
| 5,311,195 A | 5/1994 | Mathis et al. |
| 5,311,434 A | 5/1994 | Tamai |
| 5,323,321 A | 6/1994 | Smith. |
| 5,334,986 A | 8/1994 | Fernhout |
| 5,364,093 A | 11/1994 | Huston et al. |

(List continued on next page.)

FOREIGN PATENT DOCUMENTS

| | | |
|---|---|---|
| DE | 4139581 A1 | 6/1993 |
| DE | 4300927 A1 | 7/1994 |
| EP | 0317181 B1 | 5/1989 |
| EP | 0379198 B2 | 1/1990 |
| EP | 0354684 A2 | 2/1990 |
| EP | 0349652 B1 | 10/1990 |
| EP | 0786646 A2 | 7/1997 |
| WO | WO9600373 A1 | 1/1996 |
| WO | WO9607110 A1 | 3/1996 |
| WO | WO9621193 A1 | 7/1996 |

Primary Examiner—Theodore M. Blum

(57) ABSTRACT

A vehicle information system which includes an in-vehicle system 105 and a centralized server system 120. The in-vehicle system communicates with the server system using a wireless communication link 110, such as over a cellular telephone system. A position system, such as a set of GPS satellites 140, provides positioning signals that are used by the in-vehicle systems, and optionally by the centralized server system to increase the accuracy of position estimates. In one version of the system, an operator specifies a destination to an in-vehicle system which validates the destination. The in-vehicle system transmits specification of the destination to a server system 125 at the centralized server. The server system computes a route to the destination and transmits the computed route to the in-vehicle system. The in-vehicle system guides the operator along the route. If the in-vehicle system detects that the vehicle has deviated from the planned route, it replans a new route to the destination using an in-vehicle map database.

21 Claims, 25 Drawing Sheets

U.S. PATENT DOCUMENTS

| | | |
|---|---|---|
| 5,394,333 A | 2/1995 | Kao |
| 5,452,212 A | 9/1995 | Yokoyama et al. |
| 5,475,599 A | 12/1995 | Yokoyama et al. |
| 5,504,482 A | 4/1996 | Schreder |
| 5,515,284 A | 5/1996 | Abe |
| 5,539,645 A | 7/1996 | Mandhyan et al. |
| 5,543,789 A | 8/1996 | Behr et al. |
| 5,559,511 A | 9/1996 | Ito et al. |
| 5,559,707 A | 9/1996 | DeLorme et al. |
| 5,563,607 A | 10/1996 | Loomis et al. |
| 5,565,874 A | 10/1996 | Rode |
| 5,587,911 A | 12/1996 | Asano et al. |
| 5,598,534 A | 1/1997 | Haas |
| 5,604,676 A | 2/1997 | Penzias |
| 5,610,821 A | 3/1997 | Gazis et al. |
| 5,612,881 A | 3/1997 | Moroto et al. |
| 5,635,953 A | 6/1997 | Hayami et al. |
| 5,638,280 A | 6/1997 | Nishimura et al. |
| 5,642,106 A | 6/1997 | Hancock et al. |
| 5,648,768 A | 7/1997 | Bouve |
| 5,648,769 A | 7/1997 | Sato et al. |
| 5,651,056 A | 7/1997 | Eting et al. |
| 5,659,476 A | 8/1997 | LeFebvre et al. |
| 5,774,824 A | 6/1998 | Streit et al. |
| 5,794,164 A | 8/1998 | Beckert et al. |
| 5,802,492 A | 9/1998 | DeLorme et al. |
| 5,808,566 A | 9/1998 | Behr et al. |
| 5,848,373 A * | 12/1998 | DeLorme et al. ........... 701/200 |
| 5,862,500 A | 1/1999 | Goodwin |
| 5,875,412 A | 2/1999 | Sulich et al. |
| 5,922,041 A | 7/1999 | Anderson |
| 5,924,075 A | 7/1999 | Kanemitsu |
| 5,938,721 A | 8/1999 | Dussell et al. |
| 5,948,040 A | 9/1999 | DeLorme et al. |
| 5,951,620 A | 9/1999 | Ahrens et al. |
| 5,955,973 A | 9/1999 | Anderson |
| 5,959,577 A | 9/1999 | Fan et al. |
| 5,987,381 A | 11/1999 | Oshizawa |
| 6,009,403 A | 12/1999 | Sato |
| 6,028,537 A | 2/2000 | Suman et al. |
| 6,032,089 A | 2/2000 | Buckley |
| 6,070,124 A | 5/2000 | Nimura et al. |
| 6,073,075 A | 6/2000 | Kondou et al. |
| 6,075,467 A | 6/2000 | Ninagawa |
| 6,076,041 A | 6/2000 | Watanabe |
| 6,104,338 A | 8/2000 | Krasner |
| 6,124,826 A | 9/2000 | Garthwaite et al. |
| 6,131,064 A | 10/2000 | Vieweg |
| 6,141,609 A | 10/2000 | Herdeg et al. |
| 6,169,515 B1 | 1/2001 | Mannings et al. |
| 6,216,086 B1 | 4/2001 | Seymour et al. |
| 6,249,767 B1 | 6/2001 | Okayama et al. |

* cited by examiner

| | |
|---|---|
| 1501 | Plan Route (In-Vehicle): |
| 1502 | Accept Destination Specification from Operator |
| 1503 | Determine Current Location Data |
| 1504 | Establish Communication Session with Server |
| 1505 | Send Destination Specification and Current Location Data to Server |
| 1506 | IF Destination Specification Requires Server Interaction THEN |
| 1507 |     Accept Secondary Destination Specification Data from Server |
| 1508 |     Accept Secondary Destination Specification from Operator |
| 1509 |     Send Secondary Destination Specification to Server |
| 1510 | END IF |
| 1511 | Wait for Server Response |
| 1512 | Receive Planned Route, Spot Map, and Differential GPS Data from Server |
| 1513 | Close Communication Session with Server |

FIG. 15A

| | |
|---|---|
| 1551 | Plan Route (Server): |
| 1552 | Accept Communication Session with Vehicle |
| 1553 | Receive Destination Specification and Current Location Data from Vehicle |
| 1554 | Determine DGPS Correction Data |
| 1555 | Determine Vehicle Location |
| 1556 | IF Destination Specification Requires Further Operator Input THEN |
| 1557 |     Determine Secondary Destination Specification Data |
| 1558 |     Send Secondary Destination Specification Data to Vehicle |
| 1559 |     Receive Secondary Destination Specification from Vehicle |
| 1560 | END IF |
| 1561 | Determine Planned Route to Specified Destination |
| 1562 | Determine Spot Map near Vehicle Location |
| 1563 | Send Planned Route, Spot Map, and DGPS Data to Vehicle |
| 1564 | Close Communication Session with Vehicle |

FIG. 15B

| | |
|---|---|
| 1601 | Startup Maneuvers: |
| 1602 | Initialize Estimated Location using Differential GPS Data |
| 1603 | WHILE Estimated Location is not at a Point of the Planned Route DO |
| 1604 |     Track Estimated Location using (D)GPS Data |
| 1605 |     Display Spot Map and Estimated Location on Display |
| 1606 | END WHILE |

FIG. 16

| | |
|---|---|
| 1801 | Replan Route: |
| 1802 | Estimate Vehicle Location of Main Roads Network using |
| 1803 |     Dead-Reconing Location |
| 1804 | Calculate Best Route to a Maneuver or Way Point on the Previous |
| 1805 |     Planned Route |
| 1806 | Replace Planned Route with Newly Calculated Route |
| 1807 | GOTO Follow Route |

FIG. 18

| 1701 | Follow Route: |
| --- | --- |
| 1702 | FOR Each Link on Planned Route DO |
| 1703 |     At Initial Maneuver Initialize Off-Route Tolerance |
| 1704 |     WHILE Vehicle Is Travelling to the Next Maneuver Point DO |
| 1705 |         Increase Off-Route Tolerance |
| 1706 |         Track Dead-Reckoning Location |
| 1707 |         Track (D)GPS Location |
| 1708 |         IF (Dead-Reckoning Location is more than Off-Route Tolerance |
| 1709 |             from (D)GPS Location THEN |
| 1710 |             GOTO Replan Route |
| 1711 |         END IF |
| 1712 |         IF Dead-Reckoning Location is within Maneuver |
| 1713 |             Notification Window THEN |
| 1714 |             Notify Operator of Next Maneuver |
| 1715 |         END IF |
| 1716 |         IF Dead-Reckoning Location is within Maneuver |
| 1717 |             Detection Window THEN |
| 1718 |             IF Next Maneuver is Detected THEN |
| 1719 |                 Update Dead-Reckoning Location |
| 1720 |                 Update DGPS Data |
| 1721 |             END IF |
| 1722 |         END IF |
| 1723 |     UNTIL Maneuver was Detected OR |
| 1724 |         Vehicle Leaves Maneuver Detection Window |
| 1725 | UNTIL Destination is Reached |

FIG. 17

VEHICLE INFORMATION SYSTEM

CROSS-REFERENCE TO RELATED APPLICATIONS

This application is a continuation of U.S. application Ser. No. 09/136,868, filed Aug. 19, 1998, which claims the benefit of U.S. Provisional Application No. 60/056,150, filed Aug. 19, 1997.

BACKGROUND

This invention relates to an information system for motor vehicles.

Vehicle information systems have been developed that provide various types of information to operators of those vehicles. In particular, navigation systems have been developed. One type of navigation system, an autonomous navigation system, uses an on-board map, typically stored on a removable medium such as a compact optical disk (e.g., CD-ROM). The navigation system uses the on-board map to plan a route from a starting point to a destination, which is specified by the operator of the vehicle. Updating an autonomous system's map, for example to add or correct information, typically involves replacing the removable medium.

In some navigation systems the operator inputs the desired destination (and the current location, if required by the system) by entering a spelling of the destination. Some systems also allow an operator to select from a stored list of "points of interest," such as a list of gas stations or restaurants. Once the operator inputs the destination, the system plans a route along the road network to the destination. The route is typically planned to provide a shortest distance or to try to provide the shortest travel time. Once the route is planned, the operator is guided by the system along the route.

Various approaches to route guidance have been used. A particularly simple approach is to provide the operator with a sequence of discrete instructions, for instance, at intersections where the operator must turn from one street onto another. The operator indicates when he or she is ready for the next instruction. For example, the instructions are provided as an audio output, and the operator says "next" when ready for another instruction.

Another approach to route guidance uses a displayed map on which the planned route and the vehicle's location are dynamically displayed. The operator uses the map to decide when and where to turn in order to follow the planned route.

Some guidance approaches are aided by in-vehicle sensors that are used to estimate the location of the vehicle. For instance, a magnetic compass is used to estimate the direction of travel, and a velocity sensor is used to estimate the distance traveled. In addition, the location of the vehicle can be estimated using the Global Positioning System (GPS). In GPS, multiple satellites emit signals that allow an in-vehicle GPS receiver to estimate its absolute location.

Other types of vehicle information systems have also been developed. In some systems, traffic related information, such as traffic advisories, is broadcast to specially equipped in-vehicle radio receivers.

SUMMARY

In general, in one aspect, the invention is a vehicle information system. The vehicle information system features an in vehicle system and a centralized server system. The in-vehicle system communicates with the server system using a wireless communication link.

In general, in another aspect, the invention is a method for guiding a vehicle through a road network from a starting location to a destination. The method features transmitting a specification of the destination to a server, for example by transmitting a street address or an identifier of a point of interest. The server determines a route to the specified destination and transmits a specification of the route to the vehicle. The method also includes receiving from the server a specification of a planned route through the road network to the destination as well as receiving from the server a map that includes a specification of the road network in the vicinity of the planned route. For instance, the map can correspond to one or more regions around particular points on the planned route, correspond to a "corridor" around the planned route, or be a complex shaped region in the vicinity of the route. The planned route can include specifications of a multiple maneuvers to be carried out by the vehicle, and the specification of each maneuver then includes a location of the maneuver. The map can be in the vicinity of the starting location, or in the vicinity of one of the specified maneuvers. The method can also feature tracking the location of the vehicle. The method can also feature displaying the received map in conjunction with a representation of the planned route, and a location of the vehicle.

An advantage of the invention is that the vehicle does not have to have a prestored map to plan a route to a destination. Also, the invention provides a way of displaying a map of the vicinity of the starting point or of intermediate maneuver points of a planned route without requiring that the map be prestored in the vehicle. The displayed map can provide useful information to an operator of a vehicle during difficult maneuvers where turn-by-turn instructions.

In general, in another aspect, the invention is a method for tracking a vehicle. The method features receiving a reference signal from a positioning system, for example receiving signals from GPS satellites, and computing position data related to the location of the vehicle using the received reference signal. For example, the position data can be latitude and longitude estimates, or can be GPS pseudorange measurements. The method also features transmitting the position data to a server and receiving from the server position correction data. For example, the position correction can be a deviation in latitude and longitude, or can be correction terms to be applied to GPS pseudorange measurements. The method also features determining estimated coordinates of the vehicle including combining data computed from the received reference signal and the position correction data.

The method can feature repeatedly computing the position data, and determining the estimated coordinates, including combining the position data and the position correction data. The method can also feature, subsequent to the interval of time, repeatedly computing the position data and determining estimated coordinates of the vehicle using the position data without using the correction data.

In general, in another aspect, the invention is a method for tracking a vehicle. The method features receiving a specification of a first location which includes coordinates, such as latitude and longitude, of the first location. The method includes determining when the vehicle is at or passes near the first location. The method includes computing first position data using a reference signal received from a positioning system at the time at which the vehicle was determined to be at the first location. For instance, the positioning system can be a GPS positioning system, and the computed first position data can include pseudorange measurements derived from GPS satellite signals received when the vehicle was at or near the first location. The method further includes computing position correction data using the first position data and the coordinates of the first location. For instance, computing the position correction data can include computing pseudorange correction data based on the latitude and longitude of the first location and on the pseudorange measurements derived from GPS satellite signals received when the vehicle was at or near the first location. The method further includes computing second position data using a reference signal received from the positioning system at a second time subsequent to the time at which that the vehicle was determined to be at the first location, and then determining coordinates of the vehicle at the second time including combining the correction data and the second position data.

The method can feature including in the specification of the first location a specification of a maneuver to be carried out by the vehicle at the first location. Determining when the vehicle is at the first location then includes detecting when the vehicle performs the specified maneuver, for instance using vehicle sensors such as a compass, accelerometers, or a gyroscope.

In general, in another aspect, the invention is a method for detecting when a vehicle deviates from a planned route. The method features tracking a first estimated position of the vehicle using signals from a positioning system that are received at the vehicle, for example, using a GPS positioning system. The method also features tracking a second estimated position of the vehicle using an estimate of the distance traveled along the planned route. The vehicle is detected to has deviated from the planned route when the first estimated position and the second estimated position differ by at least a tolerance distance.

The method can feature detecting when the vehicle is at a first point on the planned route, such as a maneuver point, and estimating the distance traveled along the path following the first point.

The method can also feature adjusting the tolerance distance, including reducing the tolerance distance when the vehicle is detected to be at the first point on the planned route, and increasing the tolerance distance as the vehicle travels along the path following the first point.

In general, in another aspect, the invention is a method for providing guidance instructions to a vehicle operator following a planned route that includes a sequence of maneuver points. The method includes detecting when the vehicle is at a first maneuver point, and tracking the distance traveled by the vehicle from the first maneuver point along the planned route. When the tracked distance is within a predetermined notification distance of the distance between the first maneuver point and a subsequent maneuver point along the planned route the operator is notified of the subsequent maneuver.

In general, in another aspect, the invention is a method for specifying a location in a vehicle navigation system. The method features providing an in-vehicle map database to an in-vehicle system. The in-vehicle database includes data related to valid location specifications for accessing a server map database at a server system. The method also features accepting a location specification, for instance, for an operator using a user interface in the vehicle. The system validates the location specification using the in-vehicle map database and then transmits the validated location specification to the server system.

The method can also feature providing the server map database to the server system and accessing the server map database using the received validated location specification. In addition the method can also include determining a route to the specified location using the server map database, and transmitting the determined route to the in-vehicle system.

In general, in another aspect, the invention is method for estimating a location of a vehicle. The method includes determining a series of vehicle position estimates using a positioning system, and recording each of the vehicle position estimates in the series. For example, the position estimates are recorded in a non-volatile memory as the vehicle reaches a destination. The method further includes estimating the location of the vehicle including retrieving the most recently recorded in the series of location estimates, for instance after the vehicle is started after a period of being parked at the destination.

The invention has the advantage that a location estimate may be obtained, even if a positioning system, such as a GPS satellite system, is out of range, or prior to the positioning system being initialized.

In general, in another aspect, the invention is a method for vehicle guidance. The method features receiving at the vehicle a planned route to a destination location from a server, and storing the planned route at the vehicle. The method also includes providing instructions to an operator of the vehicle according to the stored planned route, for example, providing instructions at each of a series of maneuvers along the route. The method includes tracking a location of the vehicle and detecting whether the vehicle has deviated from the planned route. If the vehicle is detected to have deviated from the planned route, the method then includes planning a new route to the destination location. Planning the new route does not necessarily require further communication with the server. Planning the new route can include determining the location of the vehicle and accessing a map database stored in the vehicle.

The method can also include establishing a wireless communication channel with the server, transmitting a specification of the destination location over the wireless communication channel, and then terminating the wireless communication channel after receiving the planned route.

Advantages of this method include providing a server based route planning service to a vehicle, without requiring ongoing communication with the server to carry out guidance and route replanning functions.

In general, in another aspect, the invention is a method for collecting traffic information. The method includes tracking the location of a vehicle, including detecting when the vehicle traverses each of a plurality of segments of a road network. For each detected segment, the method includes logging traffic-related data, including logging data related to the vehicle's speed on the detected segment. The method then includes transmitting the logged data to a server The method can feature receiving a command from the server to enable logging of the traffic-related data at a vehicle. The method can also feature receiving at a vehicle a request to transmit the logged data to the server.

In general, in another aspect, the invention is a method for collecting traffic information. The method includes tracking the location of a vehicle, including detecting when the vehicle traverses each of a set of segments of a road network. For each detected segment, the method features comparing the vehicle's speed on the segment to a stored speed for that segment, and if the vehicle's speed on the segment deviates from the stored speed, transmitting a traffic notification identifying that segment to a server.

In general, in another aspect, the invention is a method for collecting traffic information. The method includes receiving traffic related data from a set of vehicles and updating a traffic database using the received traffic related data. Updating the database includes updating speed information associated with multiple road segments in a road network. The method also features planning a route through the road network from a starting to a destination location using the speed information associated with the road segments.

The method can also feature enabling a subset of an available set of probe vehicles to provide the traffic related data, and can, in addition, feature determining a part of the traffic database to target for updating, for instance, according to a the part of the database corresponding to a geographic area. Enabling the subset of probe vehicles then includes enabling probe vehicles according to the part of the database that is targeted.

In general, in another aspect, the invention is a method for specifying a destination to a vehicle navigation system. The method includes accessing a list of categories of destinations, and accepting a selection from the list of categories, for example, from an operator making the selection on a in-vehicle user interface. The method includes transmitting the selection from the list of categories to a server system, and subsequently receiving a list of destinations from the selected category from the server system. The method then includes accepting a selection from the list of destinations and transmitting the selected destination to the server system.

The method can also feature transmitting data related to the location of the vehicle to the server system. The received list of destinations then includes destinations that are in the vicinity of the vehicle.

In general, in another aspect, the invention is a method for configuring a vehicle navigation system. The method includes providing a server map database to a server. The server map database includes data related to a plurality of road segments in a road network. The method also includes providing a vehicle map database to an in-vehicle system. The vehicle map database includes data related to a subset of the plurality of road segments in the server map database which satisfy a common criterion, for instance related to the road class of the road segments.

In general, in another aspect, the invention is an in-vehicle map database. The database includes a first stored table and a second stored table. The first stored table includes multiple records each including a field containing a reference to a record containing a base name of a street in the second stored table, and a second field which identifies a prefix, a suffix, or a street type. The second stored table includes multiple records, each including a base name of a street stored in a compressed format.

In general, in another aspect, the invention is method for transmitting a route to a vehicle navigation system. The route includes multiple intermediate points joined by road segments. The method includes transmitting a specification of the location of a first of the intermediate points, and transmitting a specification of a difference between the location of a second of the intermediate points and the first of the intermediate points. The specification of the difference can use fewer than an allocated number of bits.

The method can also feature planning an initial route. The initial route includes an initial set of multiple intermediate points coupled by road segments. The planned route is formed from the initial route. For any of the road segments in the initial route for which the difference in locations of the intermediate points bounding that segment is greater than can be specified in the allocated number of bits, the method includes inserting additional intermediate points on that road segment so that the differences between the locations of the adjacent intermediate points can each be specified in the allocated number of bits.

In general, in another aspect, the invention is a vehicle navigation system. The system includes an onboard computer, including storage for a map database, a wireless communication system for passing data between the onboard computer and a remote server, an input/output device for providing a user interface between the onboard computer and an operator of the vehicle, and a vehicle sensor for providing motion-related signals to the onboard computer. The onboard computer is programmed to perform the functions of accepting a planned route from the server over the wireless communication system, maintaining a first location estimate of the vehicle using the motion-related signals from the vehicle sensor, and, using the planned route and the first location estimate, providing guidance instructions to the operator through the input/output device.

In general, in another aspect, the invention is a method for updating an in-vehicle navigation system. The method includes receiving a version number associated with information stored in the in-vehicle system. If the information stored in the in-vehicle system has a version number prior to the version of information a server, the method includes transmitting update information from the server to the in-vehicle system. The information stored in the in-vehicle system can include map data or computer instructions.

The method can feature prioritizing the update information, for instance, according to the geographic area represented by the update information and transmitting the update information in order of the priority.

In general, in another aspect, the invention is a vehicle information server system. The system includes a vehicle communication interface for providing wireless data communication between multiple vehicles and a set of information system. The set of information systems includes a navigation system for accepting route planning request from the vehicles and providing planned routes through the communication interface, and a communication system coupled to an external information system for delivering information from the external information system to the vehicles.

In general, in another aspect, the invention is a method for providing traffic related information to a user. The method features accepting from the user a specification of a path made up of one or more road segments in a road network and receiving traffic data related to road segments in the road network. If the received traffic data indicates an exceptional traffic condition on the specified path, the user is notified of the traffic condition.

Other features and advantages of the invention will be apparent from the following description, and from the claims.

DESCRIPTION OF DRAWINGS

FIG. 15A is a pseudocode listing of an in-vehicle route planning procedure;

FIG. 15B is a pseudocode listing of a server route planning procedure;

FIG. 16 is a pseudocode listing of a startup maneuver procedure;

FIG. 17 is a pseudocode listing of a route following procedure;

FIG. 18 is a pseudocode listing of a route replanning procedure;

DESCRIPTION

1 Overview (FIGS. 1, 6–10)

Figure 1:
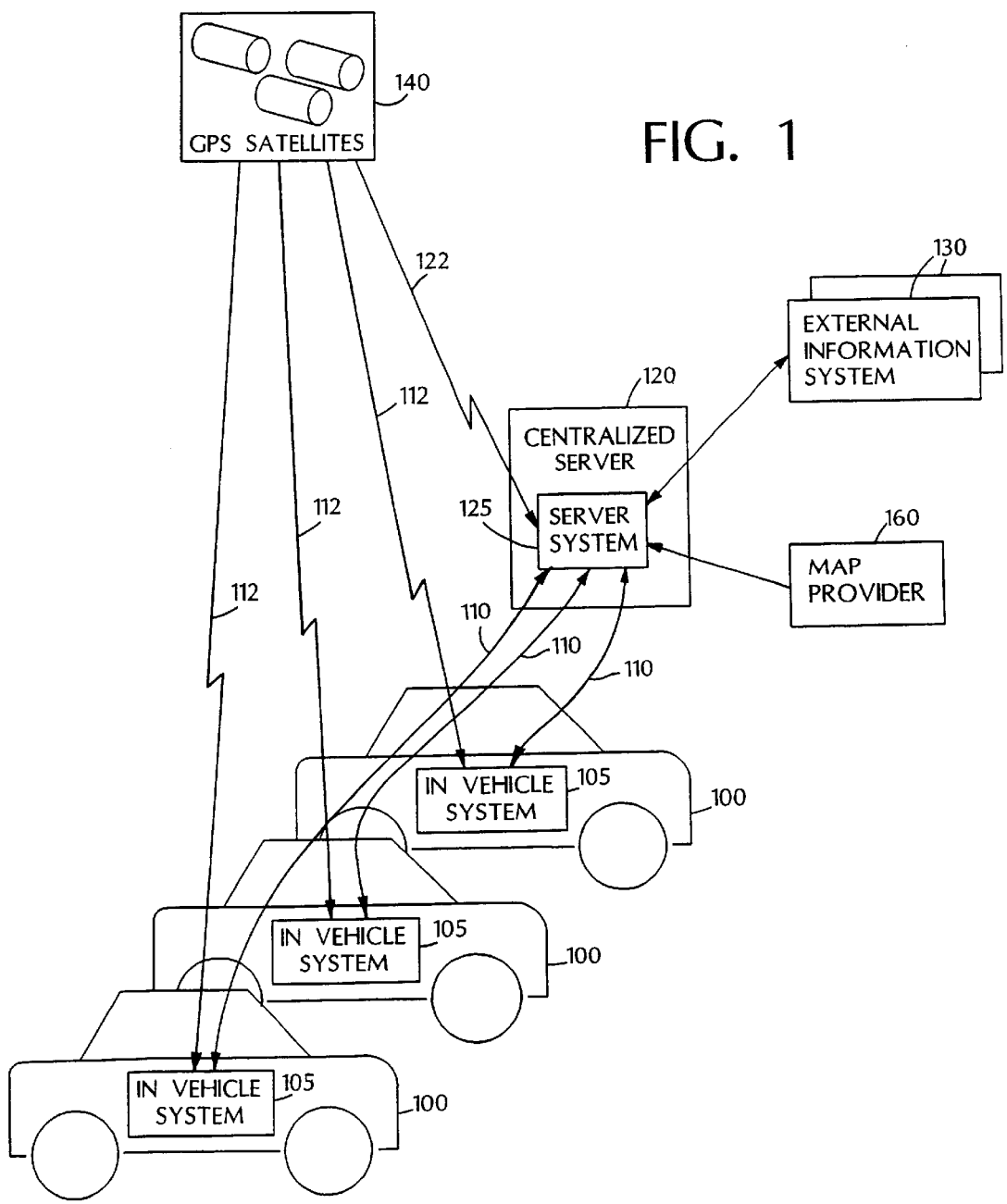
FIG. 1 is a block diagram of a vehicle navigation system.

1.1 Architecture (FIG. 1)

Referring to FIG. 1, a vehicle information system provides services, including a route planning and guidance (i.e., a "navigation") service, to the operators of multiple vehicles 100, which are free to drive throughout a wide geographic area. To provide these services to the operators of the vehicles, the vehicle information system performs some functions in a server system 125 at a centralized server 120 that is at a fixed location, and other functions in in-vehicle systems 105 installed in each of the vehicles 100. The vehicle information system also includes a positioning system that provides a reference for estimating the locations of vehicles 100 in absolute terms (i.e., in terms of their latitudes and longitudes). In particular, Global Positioning System (GPS) satellites 140 provide signals that when received at the vehicles enable the in-vehicle systems to estimate their locations.

The navigation service of the vehicle information system as a whole, which are provided through a combination of functions that are performed by server system 125 and by an in-vehicle system 105, enable an operator of a vehicle to specify a desired destination, and then to be guided by the system to that destination while driving the vehicle. In-vehicle system 105 tracks (i.e., repeatedly estimates) the position of the vehicle as it travels to the desired destination, and provides instructions to the operator to guide the operator to the desired destination. For instance, in-vehicle system 105 provides an instruction to make a turn at an upcoming intersection while the vehicle is approaching the intersection. Also, in-vehicle system 105 typically determines when the operator has made an error and the vehicle is off a planned route. If the vehicle is off route, in-vehicle system 105 provides the operator with instructions to continue to guide the vehicle to the destination despite the error.

Server system 125 provides various services to in-vehicle system 105, in a "client-server" arrangement in which in-vehicle systems 105 request services from server system 125. For instance, a route planning function is performed by server system 125 at the request of in-vehicle system 105 while route guidance functions are performed by in-vehicle system 105.

In-vehicle systems 105 are coupled to server system 125 by wireless communication links. In particular, in-vehicle systems 105 at times communicate with server system 125 over signal paths 110 using modulated data signals that are passed over a standard analog cellular telephone system (i.e., using the Advanced Mobile Phone Service (AMPS) standard). An in-vehicle system 105 typically operates in an autonomous mode after an initial exchange with server system 125. During the initial exchange, a starting location (or other location-related data), speed and heading, and a desired destination are uploaded from the in-vehicle system to the server system and then a planned route is downloaded from the server system to the in-vehicle system. After planned route information is downloaded to the vehicle from the server system, the in-vehicle system does not require further interaction with the server system to operate in its autonomous route guidance mode. While in the autonomous route guidance mode the in-vehicle system can recover from an operator going off the planned route without necessarily requiring further communication with the server system.

In-vehicle systems 105 receive signals from GPS satellites 140 over radio frequency communication paths 112. Server system 125 also receives signals from GPS satellites 140 over radio frequency communication path 122. As is described more fully below (see Section 2.4), data derived from signals received by server system 125 from GPS satellites 140 is used at times by both server system 125 and in-vehicle systems 105 to improve the location estimates of vehicles 100, for instance, using "differential" GPS calculations.

Referring still to FIG. 1, server system 125 relies on a map provider 160, for instance, a vendor of map-related information, to provide information related to the road network, including the locations and types of road segments that interconnect to form the road network. Map provider 160, or some other external information provider, also provides other map-related information such as the locations of typical points of interest such as city centers, restaurants, and gas stations.

In some versions of the system, server system 125 also serves as a gateway to external information systems 130. These external systems provide information used by server system 125, or provide information that is passed directly to in-vehicle systems 105. For instance, an external information system 130 can provide traffic-related information that is used by server system 125 to determine a fastest route from a starting to a destination location. In another-instance, an external information system 130 can provide communication services to vehicle operators, such as a paging service.

Alternative communication approaches between in-vehicle systems 105 and server system 125 can be used. Use of standard analog cellular telephone links is useful due to the broad geographic coverage in North America of the infrastructure needed to support such links. In other parts of the world, digital cellular telephone links may be more appropriate if the necessary infrastructure is available. Such a digital-based infrastructure is expected to be available in North America in the future. A satellite-based communication system can alternatively be used to link the in-vehicle systems to the server system. Also, other wireless data communication systems can be equivalently used to couple in-vehicle systems 105 and server system 125. Such systems are currently being deployed in North America (e.g., ARDIS, RAM, CDPD, GSM), although the geographic coverage is not yet adequate to support this system and provide broad geographic availability to vehicle operators. Many wireless communication systems also include a "short message" capability with which short messages can be transferred. Such short message services can alternatively be used for some types of communication between the in-vehicle systems and the server system, for instance for notification of exception conditions.

Also, alternative positioning systems can be used rather than relying on signals from GPS satellites 140. For instance, a roadside optical or radio frequency beacon systems can be used to provide location information to vehicles. Such a roadside beacon system is not broadly available in North America. On the other hand, the GPS-based approach provides broad geographic coverage today.

Centralized server 120 is "centralized" in that it provides services at one location for vehicles that are distributed throughout a geographic area. The centralized server's location does not have to be "central" or even located in the same geographic area as the vehicles it services. Also, although the system is described in terms of a single centralized server 120, multiple servers can alternatively be used. When multiple servers are used, in-vehicle systems 105 can be configured to access particular servers for all, or for particular types of, service requests.

1.2 Operation (FIGS. 6–10)

General operation of the navigation service of the vehicle information system can be understood with reference to FIGS. 6–10, which illustrate various representations of exemplary maps and routes that are used in the system. These drawings correspond to a common geographic area that is shown schematically in FIG. 6. The geographic area shown is only a very small portion of the area that is typically supported by the navigation service, which may be as large as the United States or multiple countries in Europe.

Figure 6:
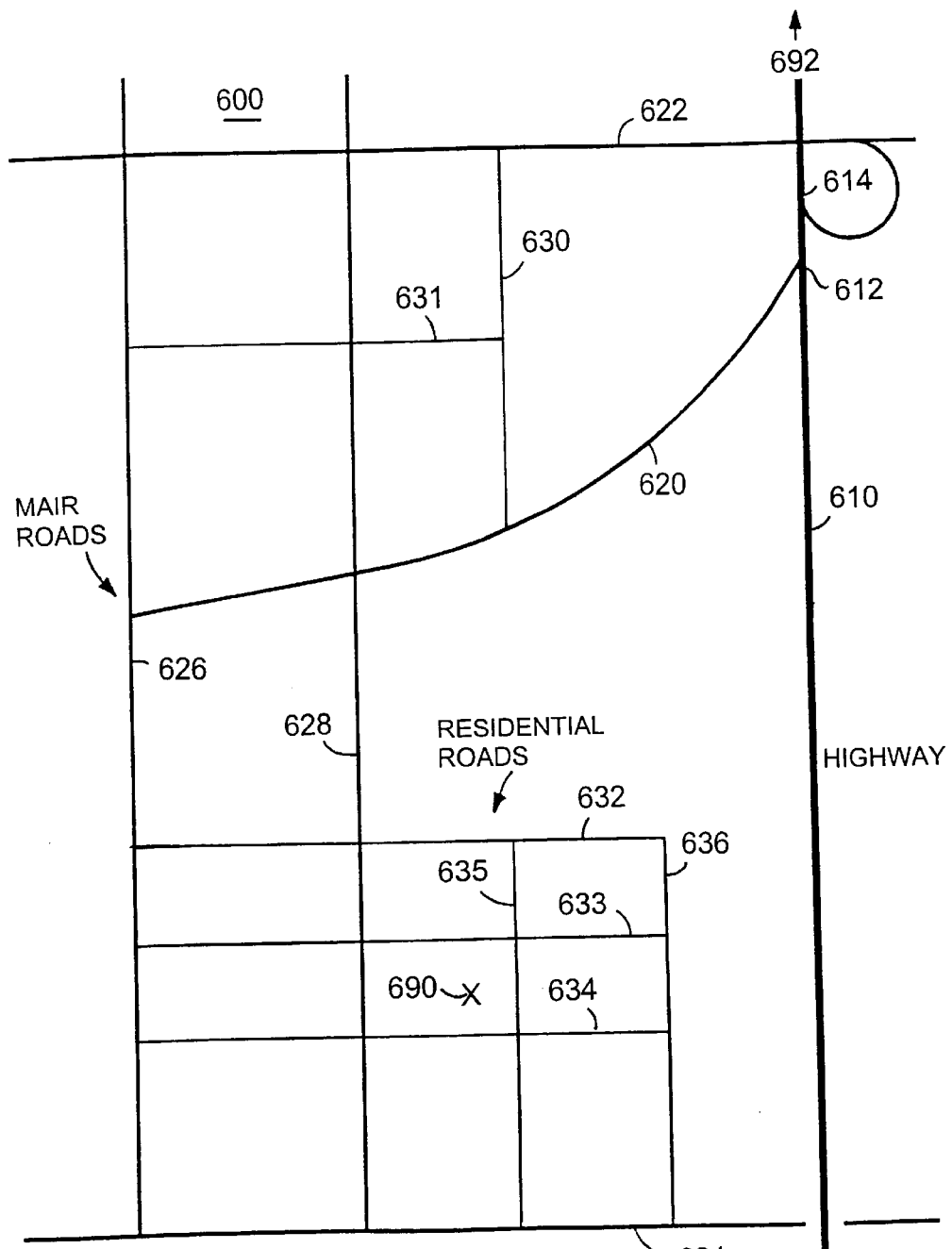
FIG. 6 is a schematic map showing the road network in an exemplary region.

Referring to FIG. 6, a map 600 is illustrated with three classes of roads shown in different line widths. In general, roads are classified according to their size or typical vehicle speed, for example, highways, limited access roads, main roads, and side streets. In FIG. 6, a highway 610 is shown as a thick line running along the vertical orientation of the drawing. A set of main roads 620, 622, 624, and 626, which is shown in medium thickness lines, form an intersecting network. Main roads 620 and 622 are connected to highway 610 at two on-ramps, 612 and 614, respectively. A set of residential roads (side streets) 630–636 completes the road network.

In this example, an operator and vehicle are initially at the point marked 'X' 690. The operator wants to get to a desired destination 692 that is not shown in the drawings, but that is best accessed by following highway 610 as indicated in the drawings.

As the first step, the operator enters a specification of desired destination 692 into in-vehicle system 105. For instance, the operator enters the city, street, and street number of a destination address. The destination is validated by the in-vehicle system, for instance validating that the street address is in an allowable range for the specified street.

After in-vehicle system 105 has accepted and validated the destination specification, it establishes a communication session with server system 125 over cellular telephone link 110 and sends the destination specification to the server system. The in-vehicle system also sends information to the server system that allows the server system to determine the vehicle's starting location 690. For instance, the in-vehicle system sends the estimated latitude and longitude output obtained from a GPS receiver in the vehicle, or sends other raw output from its GPS receiver.

Figure 7:
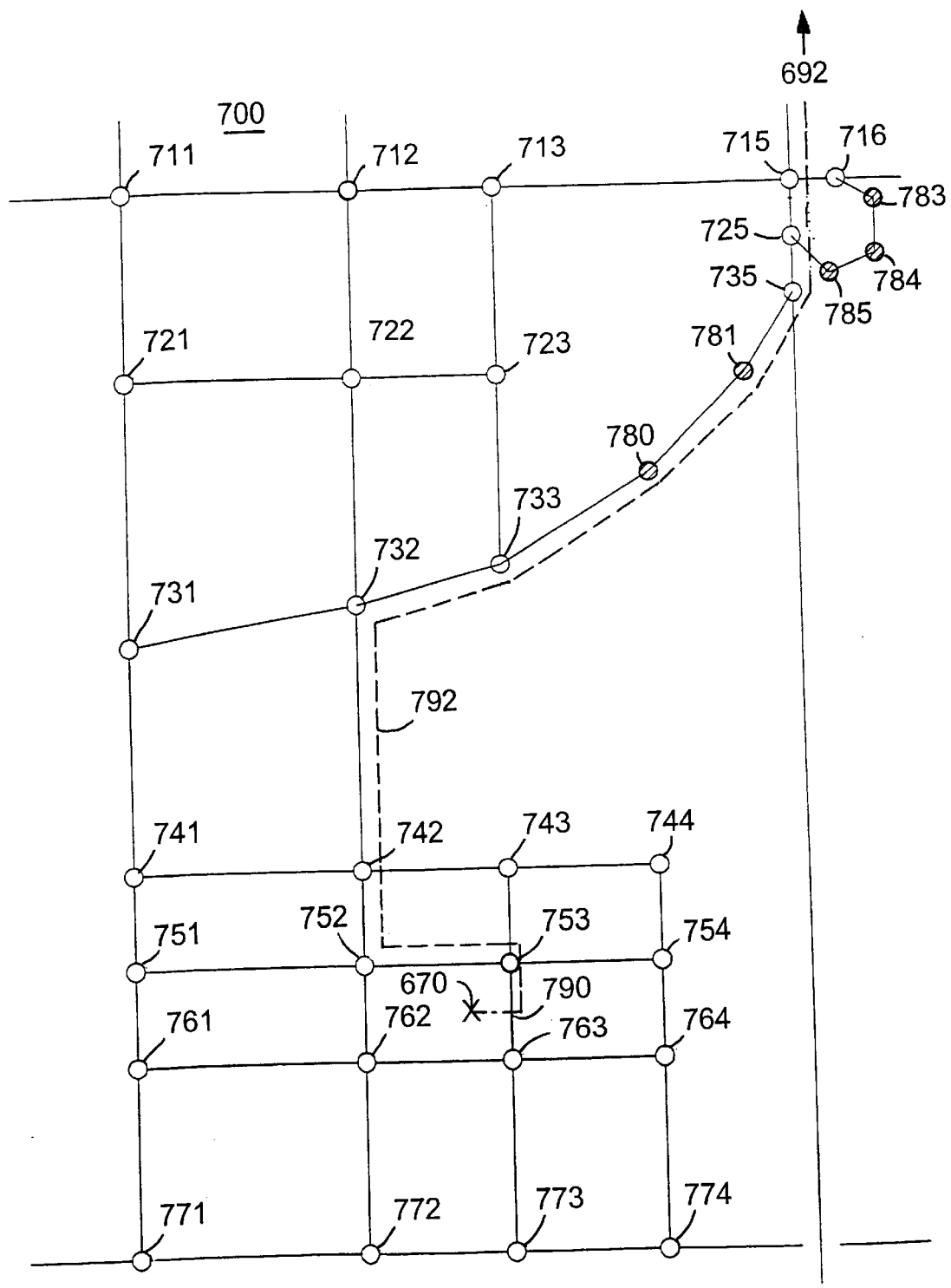
FIG. 7 is a graph representation of the road network in the exemplary region.

Referring to FIG. 7, the server system includes a stored detailed representation of the road network 700. The network is represented as a graph with a set of nodes, indicated in the drawing by open circles, that are interconnected by links (arcs) that correspond to road segments. Links in the graph have associated stored data which includes the class of the road represented by the links. Each node in the graph has associated data including its latitude and longitude (or equivalently its relative location to another node that is at a known location), as well as other information, such as which turns from one link to another link joined at the node are valid. Many links are approximated by straight line segments joining the nodes at each end of the link. Some links, such as the links joining nodes 733 and 735 or nodes 716 and 725, represent curved road segments. To represent such curved road segments, links can include one or more "shape points," represented as hatched circles 780–785 in the drawing. Each shape point has location data associated with it. The segments between adjacent shape points, or between nodes and adjacent shape points, are approximated by straight line segments.

Server system 125 uses the information provided by the in-vehicle system related to the location of the vehicle 690 to determine the starting latitude and longitude of the vehicle Based on the vehicle's latitude and longitude, speed, and heading, the server system finds the vehicle's starting link in its graph representation of road network 700. In this example, this first point on the road network is on the link joining nodes 753 and 763.

The server system next computes a best path to destination 692. "Best" can be based on a variety of criteria such as the smallest total distance, or the shortest expected travel time using information related to the expected speed of travel along links of the roadway graph. In this example, this planned route is illustrated by the dotted line 792. Referring back to FIG. 6, this planned route has the vehicle starting on residential road 635 and first making a left on residential road 632. The vehicle then is to make a right turn onto main road 628, and a right onto main road 620. Main road 620 merges onto highway 610. The vehicle then is to continue along highway 610 toward destination 692.

Figure 8:
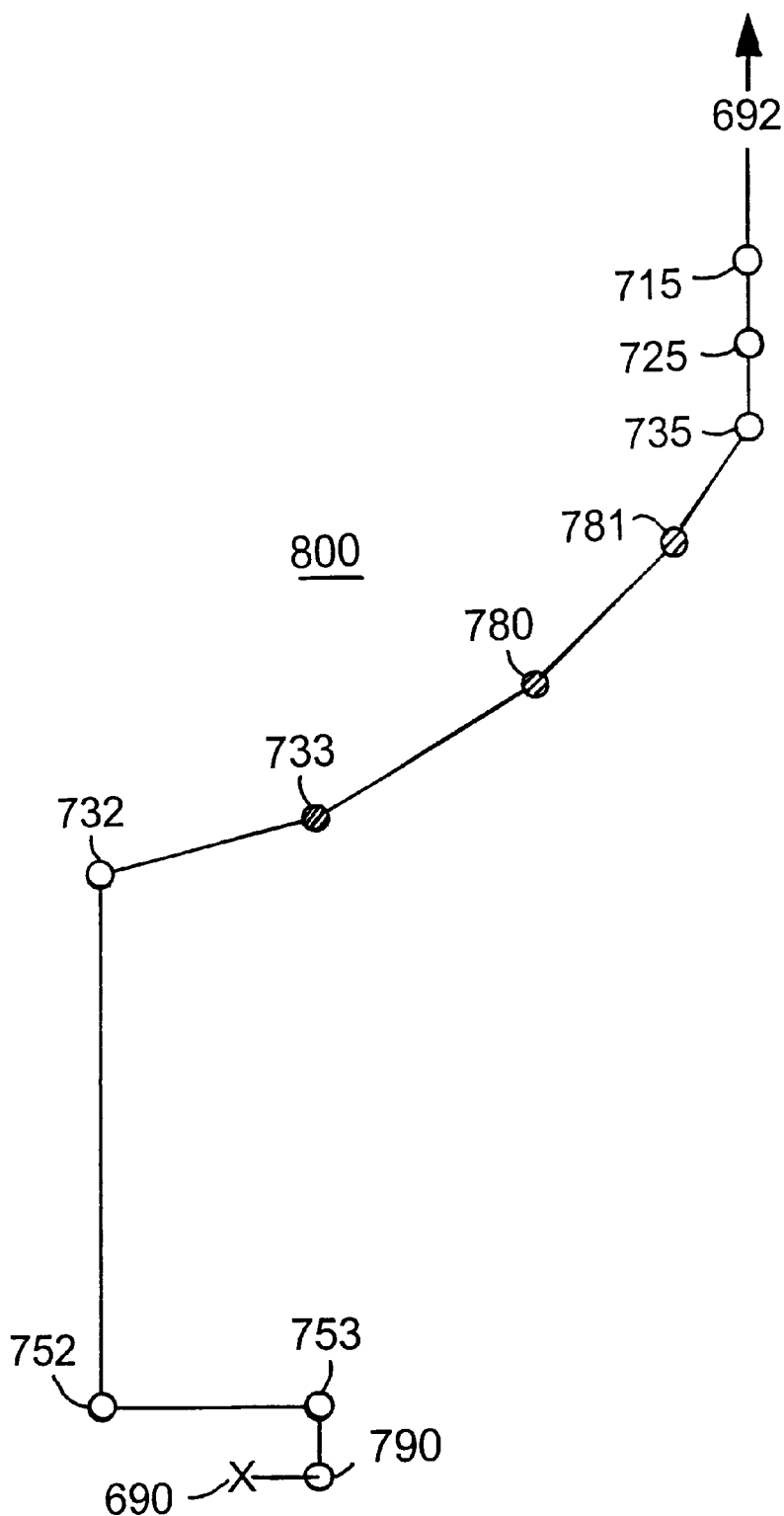
FIG. 8 illustrates an exemplary planned route that is downloaded from a server system to a vehicle.

Referring to FIG. 8, planned route 800 is downloaded from the server system to the in-vehicle system in the form of a sequence of links joined by nodes. Each node along the route (other than necessarily the start node) corresponds to a node in the server's road network 700 (FIG. 7). Nodes along planned route 800 correspond to "maneuvers" that must be carried out by the operator. For example, the maneuver at node 790 is "turn left onto road 635" (See FIG. 6). Each link along the route can have one or more "way points." Way points correspond to shape points in the server's road network 700, or to nodes which are intersections at which the operator does not have to make a maneuver, that is, nodes of the server's road network 700 at which the operator simply continues without turning or making some other maneuver. In FIG. 8, nodes 733, 780, and 781 are way points on the link joining maneuver points 732 and 735.

In principle, if the operator could always be expected to follow directions exactly, then the operator will drive to the desired destination. However, various factors may result in the operator not reaching the desired destination without further planning. These factors include:

Inaccuracy in the estimate of the vehicle's initial location, for example due to closely spaced side streets, The operator's inability to follow directions, particularly during the initial startup portion of a route where the directions may be complicated, Errors in the system's map of the road network, for instance, due to unexpected road construction, and Inaccuracy in estimating the distance traveled by the vehicle.

Figure 9:
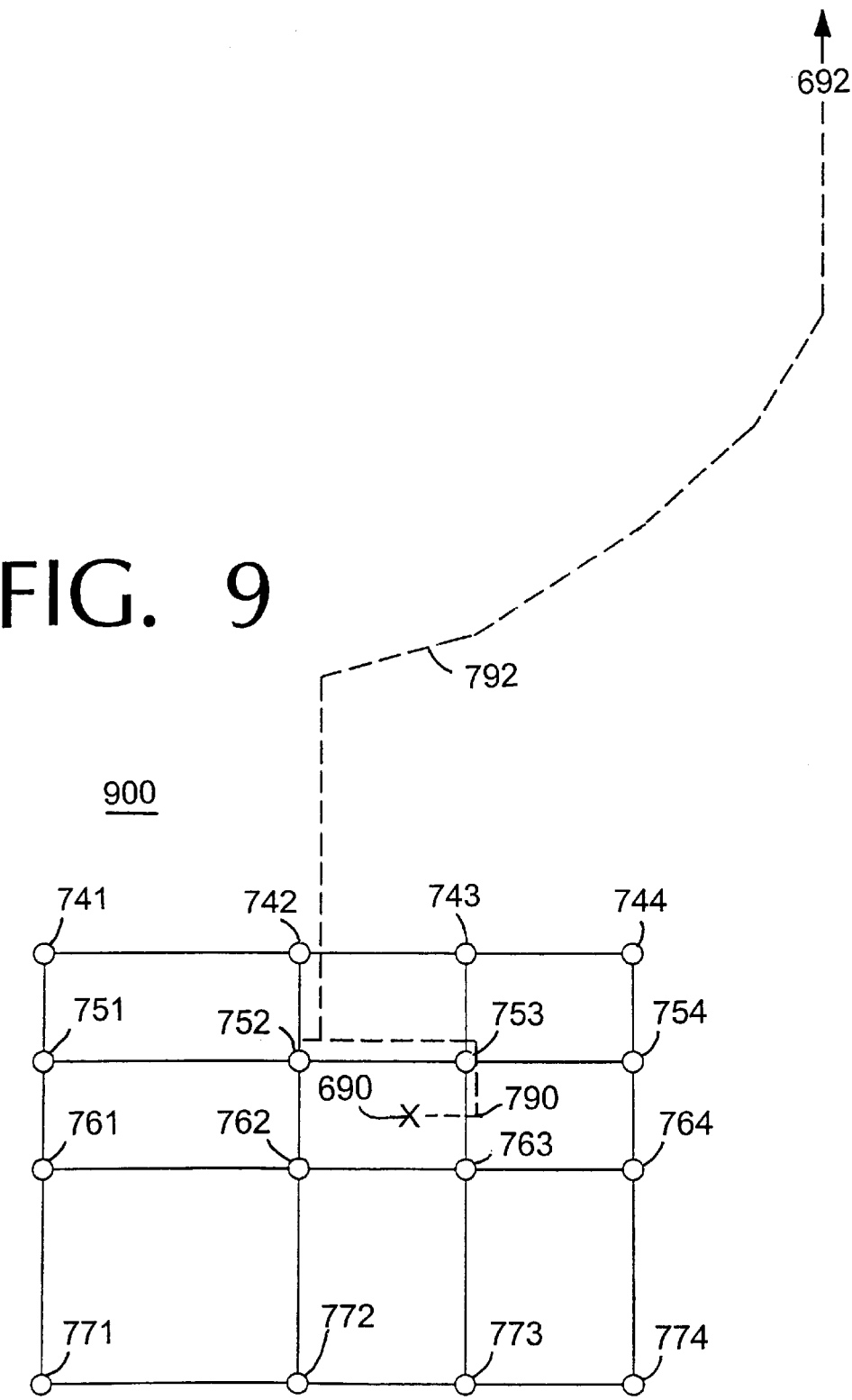
FIG. 9 is an exemplary spot map that is downloaded from a server system to a vehicle.

In order to account for errors associated with the startup portion of the route, the server system downloads to the in-vehicle system a detailed map 900, known as a "spot map," around initial location 690. Referring to FIG. 9, map information related to nodes and links in the vicinity of starting location 690 are downloaded. Spot map 900 has as high a level of detail as does the server's road network 700, but is limited geographically, for instance including all nodes within two links of the starting location.

The server system can also download a spot map around one, or more, maneuver points, or around the destination. For instance, if a maneuver is particularly complex, the server system would download a spot map around that maneuver point.

After planned route 800 and spot map 900 are downloaded to the vehicle, communication between in-vehicle system 105 and server system 125 is typically completed. At this point, the operator can preview the route, or can start traveling to the destination. The operator can also start traveling before the planned route is downloaded. The in-vehicle system begins providing initial guidance commands and displaying the spot map around the starting location to the operator as soon as it is downloaded without necessarily waiting for the complete route to be downloaded.

While traveling to the destination, the in-vehicle system attempts to track the location of the vehicle. As the in-vehicle system determines that the vehicle is approaching each maneuver point, it provides aural and graphical instructions to the operator regarding the action to take at that maneuver point. If a spot map has been downloaded for the maneuver, the in-vehicle system displays the spot map in addition to, or instead of, the graphical instructions.

During the initial portion of the trip or near a maneuver for which the server system has provided a spot map, while the vehicle is in the region of a spot map 900, the spot map is used by the in-vehicle system to guide the operator onto the planned route. In particular, the in-vehicle system displays the spot map and the initial portion of the planned route to the operator. In addition, the in-vehicle system displays the tracked location of the vehicle in conjunction with the spot map. This allows the operator to recover from errors during the initial portion of the trip by seeing that the tracked location is not following the planned route, and using the roads shown on the spot map to determine what turns to make to get back to the planned route.

Figure 10:
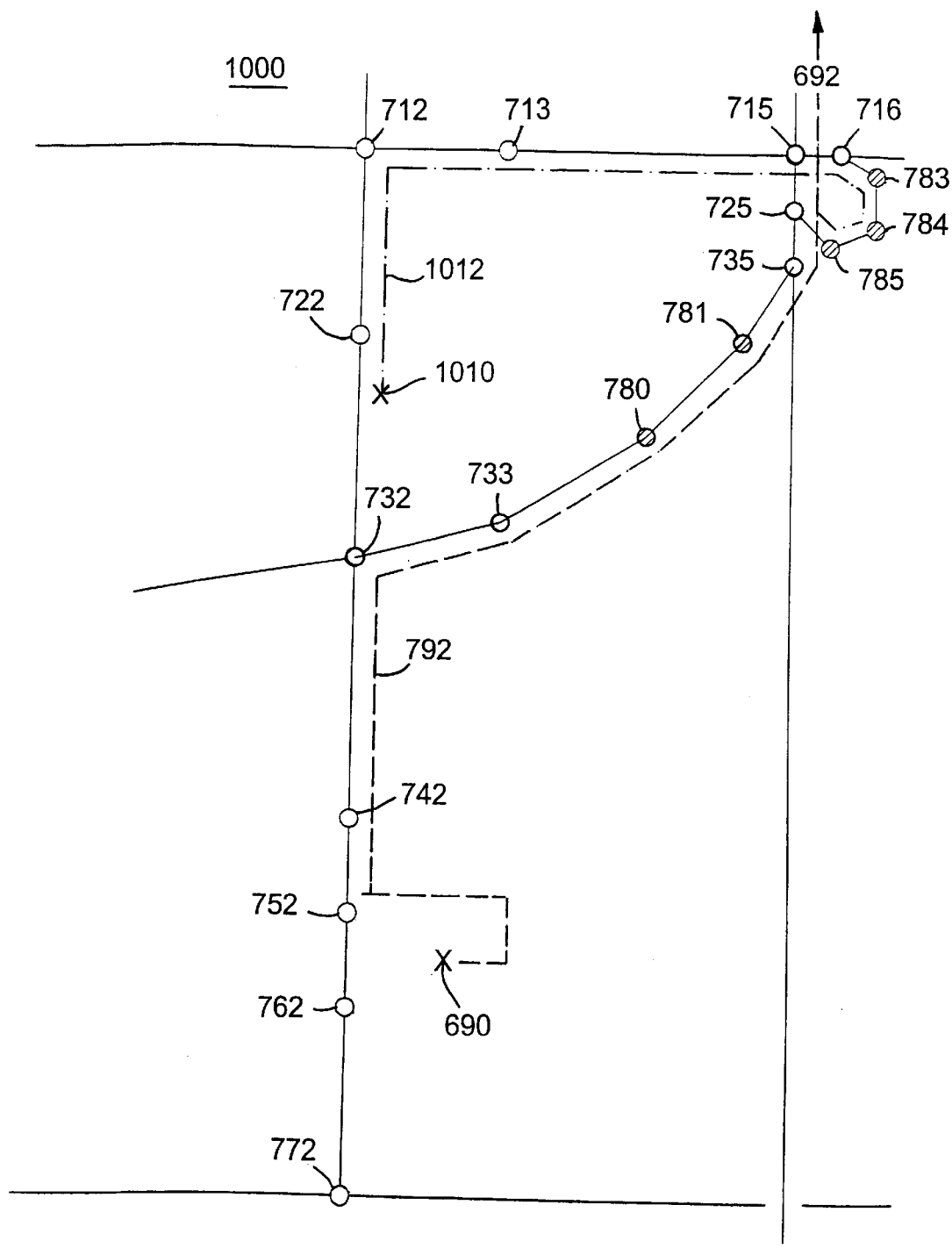
FIG. 10 is a main roads map that is preloaded in a vehicle.

The in-vehicle system also has a preloaded main roads network 1000, which is a stored version of the map that includes only main and larger roadways (i.e., it does not include residential roads). A portion of the main roads network 1000 is shown in FIG. 10. Main roads network 1000 has a similar form as the server's road network 700 shown in FIG. 7, except that fewer links are included. For reference, the planned route 792 is illustrated by a dotted line.

While traveling toward the destination, the in-vehicle system tracks an estimated location of the vehicle. If the operator does not properly follow the directions, the in-vehicle system will typically detect when the vehicle has diverged too far from the planned route. When it detects that the vehicle is off-route, it plans a corrected route based on the main roads map shown in FIG. 10 which get the vehicle back onto the originally planned route.

Referring back to FIG. 6, in this example, the operator fails to make the right turn from main road 628 onto main road 620, continuing instead on main road 628. Referring back to FIG. 10, the in-vehicle system determines that the vehicle is off-route at a point 1010, which corresponds to a point on a main road segment between nodes 732 and 722 when it should have been at a point on the link joining points 732 and 735. Using its main road network 1000, the in-vehicle system plans a corrected route indicated by the dashed line 1012. This re-planned route joins the originally planned route at point 725. Note that in replanning a route after an off-route condition occurs, the in-vehicle system does not necessarily have to contact the server system, relying instead on its main roads network 1000.

The in-vehicle system therefore uses a combination of main roads network 1000 that is preloaded into the vehicle and spot maps 900 that are downloaded to the vehicle along with planned route 800 to replan the route when the vehicle is detected to not be following the planned route.

In an alternative version of the system, spot maps 900 can be used to augment main roads network 1000 to re-plan the route if the operator fails to follow the planned route during the initial portion of the trip.

In the system operation described above, a vehicle operator receives instructions in the form of Graphically presented maneuver instructions, Aural maneuver instructions, and Spot map based instructions.

Alternative versions of the system use subsets of these forms of instructions. For instance, a version of the system can use aural instructions alone. Another version of the system can use graphically presented maneuver instructions without any map based or aural instructions. Other combinations or instruction modes can be used as well. Furthermore, alternative versions of the system can give the vehicle operator control over which instruction modes are used, for instance, allowing the operator to switch between map based and graphical instruction based modes.

2 Hardware and Software Architecture (FIGS. 2–5)

Figure 2:
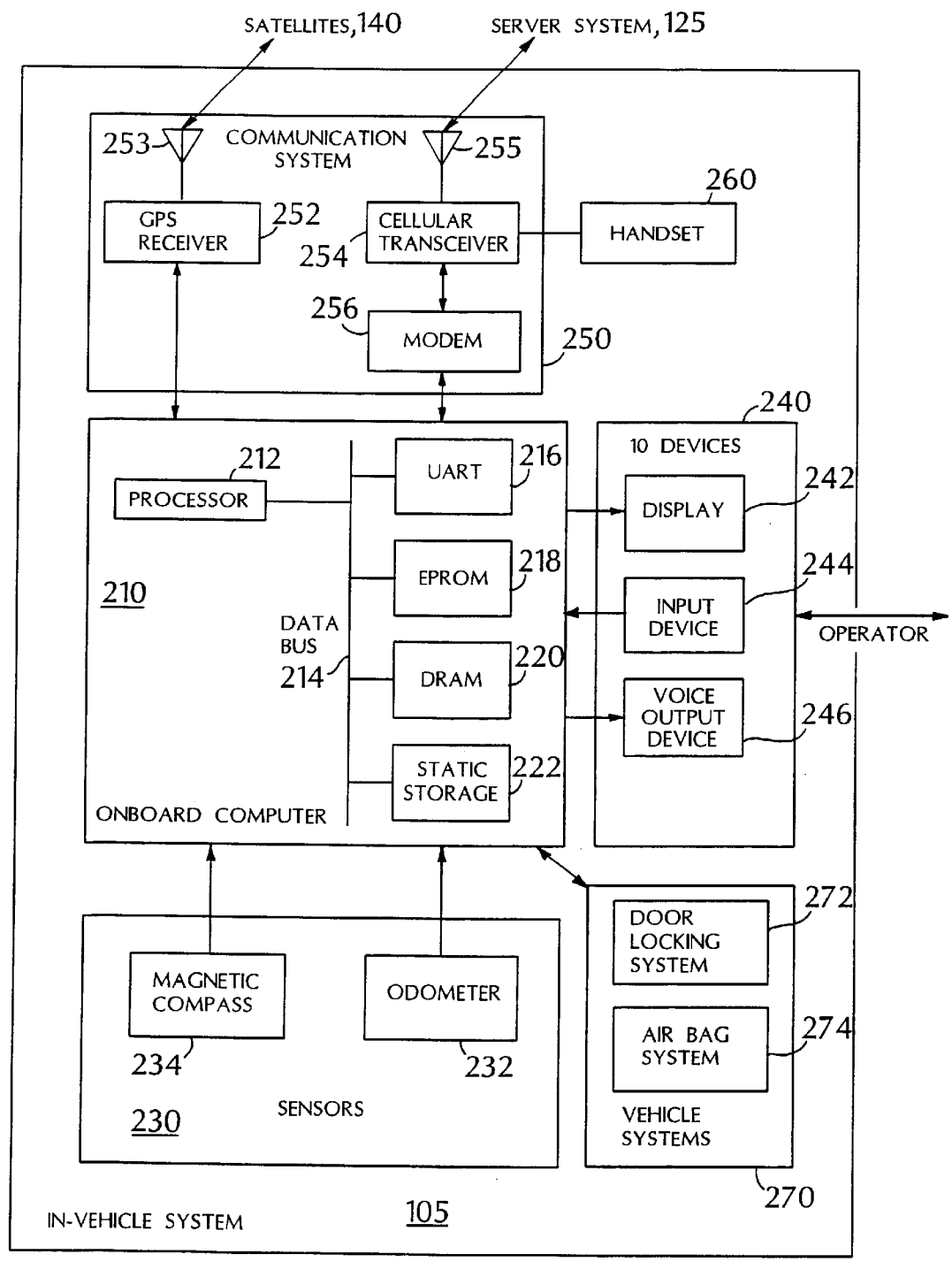
FIG. 2 is a block diagram of in-vehicle components of the system.

2.1 In-Vehicle System Components (FIG. 2)

Referring to FIG. 2, each in-vehicle system 105 includes an onboard computer 210 which is used to coordinate the operation of other components, including sensors 230, which provide information related to the motion of the vehicle, input/output (I/O) devices 240, which provide an interface between the operator of the vehicle and the navigation system, and communication system 250, which provides communication links from GPS satellites 140 and to and from server system 125. Onboard computer 210 is also coupled to vehicle systems 270, which include door locking system 272 and airbag system 274.

Onboard computer 210 has limited storage and processing capabilities. In this version of the in-vehicle system, onboard computer 210 includes a processor 212 coupled to other components of the onboard computer over a data bus 214. The other components includes dynamic random access memory (DRAM) 220, which provides 2 MB of working storage for processor 212, erasable programmable read-only memory (EPROM) 218, which provides 4 MB of non-volatile storage, and universal asynchronous receiver-transmitter (UART) 216, which provides serial communication capabilities to other system components. Alternative hardware configurations, for instance, with more or less memory, can be used.

Processor 212 is also coupled to a static storage 222 which is a non-volatile storage used to store code and data for operation of the system. In particular, as is described further below, static storage 222 is used to store map-related information, such as main roads network 1000 (FIG. 10), which is used during route planning and guidance procedures executed on onboard computer 210. Static storage 222 is a removable 40 MB flash memory system which emulates a disk storage device. Alternative static storage devices can be used, including removable and non-removable disk storage devices and semiconductor memories.

Sensors 230 include a velocity sensor 232 which provides a velocity signal to onboard computer 210. The velocity signal encodes the distance traveled by the vehicle by providing a constant number of pulses per revolution of the output of the vehicle's transmission, and which therefore provides a relative constant number of pulses per mile traveled. Sensors 230 also includes a magnetic compass 234 which provides a signal to onboard computer 210 encoding the orientation of the vehicle. Alternative versions of the system do not necessarily include magnetic compass 234, relying only on the velocity signal. Also, alternative versions may include other sensors of the state of the vehicle, including a gyroscope or accelerometers for determining the rate of rotation of the vehicle, or a differential velocity sensor, which provides the relative speed of the wheels on either side of the vehicle thereby encoding a turning radius of the vehicle as it goes through a turn.

I/O devices 240 includes a display 242. In versions of the in-vehicle system in which only graphical commands are displayed, display 242 is a small (e.g., 4–5 lines of text high, 64×240 pixels) monochrome liquid crystal display (LCD) which is used to provide text and schematic image instructions to the operator of the vehicle. In versions of the in-vehicle system in which spot maps are displayed to the operator, display 242 is 4 to 5 inch diagonal display with approximately 200×200 pixels, which is large enough and has a high enough resolution to provide a detailed map display to the operator that can be used to provide map-based directions to the operator. Also, in alternative versions of the system, visual feedback is not necessarily used, relying instead solely on audio instructions from the system to the operator.

I/O devices 240 also includes an input device 244. Input device 244 includes multiple push buttons associated with display 242. The operator uses these buttons to select alternatives shown on display 242, or to scroll the list of displayed alternatives. Alternative versions of the system can include an alphanumeric keyboard coupled to the onboard computer.

Figure 2A:
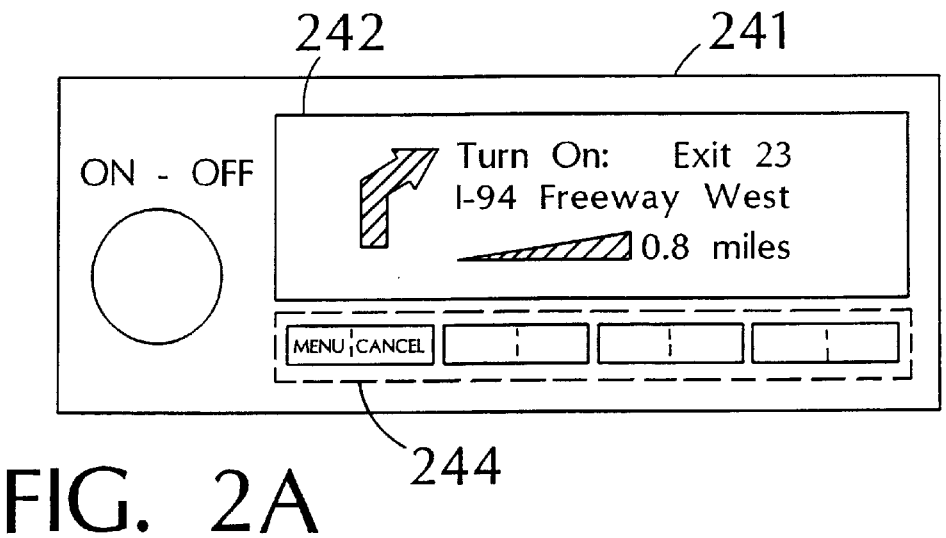
FIGS. 2A–C show an integrated input/output device.
Figure 2B:
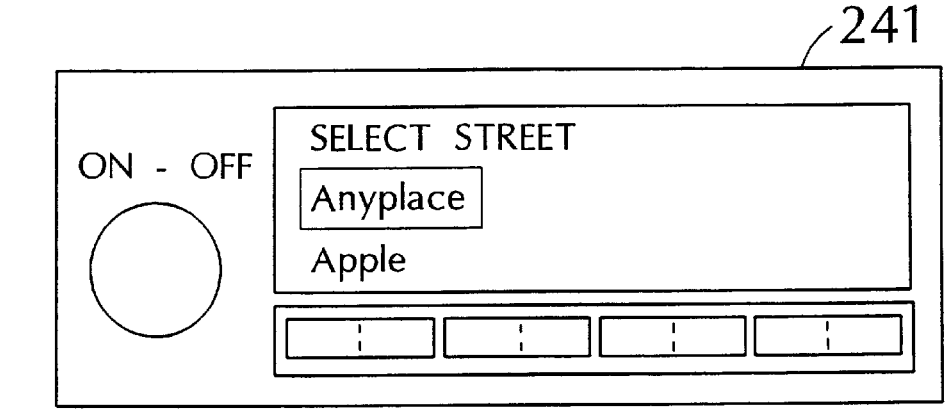
Figure 2C:
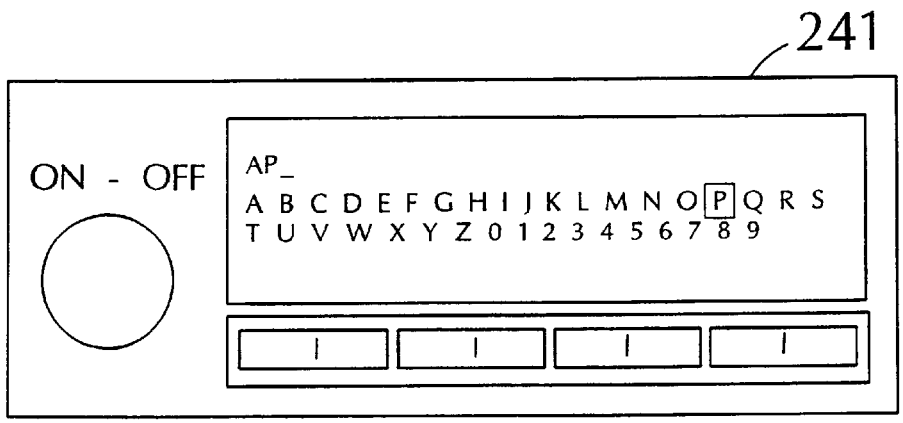

Referring to FIGS. 2A–C, an integrated I/O device 241 includes display 242 and a set of four rocker switches that are part of input device 244. One rocker switch is dedicated to "menu" and "cancel" inputs while the other three are reconfigurable. Referring to FIG. 2A, display 242 is at times used to display both text commands and graphical representations of commands. Referring to FIGS. 2B–C, display 242 is used at times to provide visual feedback to the operator when inputting information. FIG. 2B illustrates selection from a list and FIG. 2C illustrates spelled input in which the operator uses the rotary switch to select letters to spell an input word.

Referring back to FIG. 2, I/O devices 240 also include a voice output device 246. Voice output device 246 provides audio output of speech commands that are stored or formed on onboard computer, for example, using compressed or concatenated waveforms or a speech synthesizer.

I/O devices 240 can be dedicated to onboard computer 210, or can alternatively be part of another vehicle component such as a radio. In the latter case, display 242 and input device 244 are the display and input buttons of the other component, respectively. Many audio components include standard control interfaces, such as the ACP (Audio Control Protocol) interface used in vehicles manufactured by the Ford Motor Company. In such a case, onboard computer 210 can communicate with the audio component using a standard communication interface. Voice output can be provided to the operator by passing it through the audio system, or alternatively, onboard computer 210 can mute or attenuate the audio system while voice output is provided through a dedicated audio path.

Referring still to FIG. 2, communication system 250 includes a GPS receiver 252 coupled to a GPS antenna 253 for receiving signals from GPS satellites 140. GPS receiver 252 repeatedly provides location-related information to onboard computer 210, for example, at one-second intervals. The location related information can be an estimated location, in terms of latitude and longitude, or other raw measurements that can be used to compute an estimated location. GPS receiver 252 can also receive correction data from onboard computer 210, which it uses to compute increased accuracy location estimates from its raw measurements. As is described further below, the correction data can be provided by server system 125 and is used at times to increase the accuracy of the location information provided by GPS receiver 252.

Communication system 250 also includes a cellular transceiver 254 coupled to a cellular telephone antenna 255. Cellular transceiver 254 provides voice and data communication capabilities to the vehicle. A modem 256 is coupled between onboard computer 210 and cellular transceiver 254. Data sent to and received from server system 125 over a cellular telephone line passes through modem 256. Cellular transceiver 254 is also coupled to a handset 260. The operator can place standard telephone calls using handset 260 when cellular transceiver 254 is not being used to communicate with server system 125.

Figure 3:
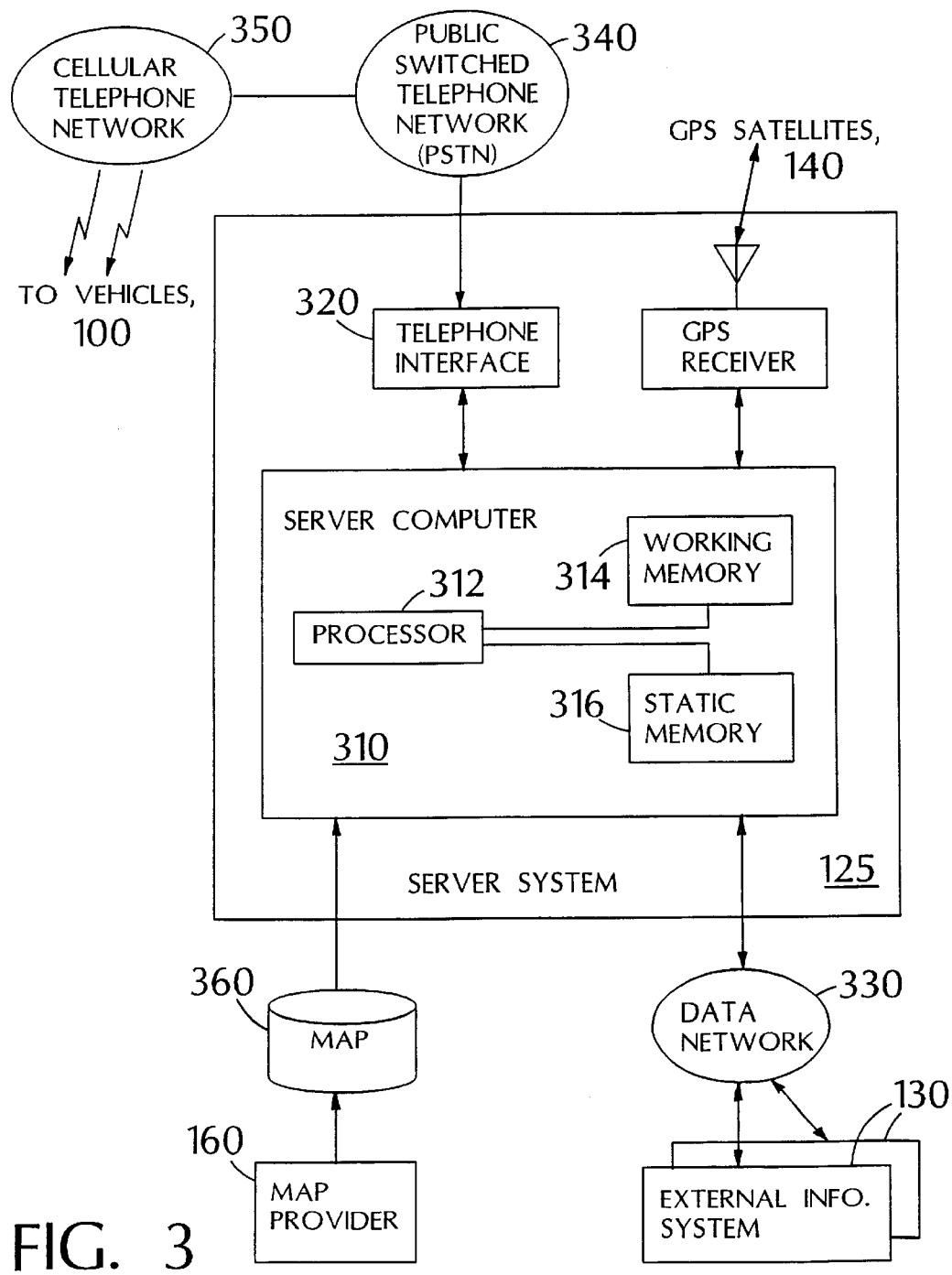
FIG. 3 is a block diagram including components of a server system.

2.2 Server System Components (FIG. 3)

Referring to FIG. 3, server system 125 includes a server computer 310, which communicates with in-vehicle systems 105. Server system 125 includes a telephone interface 320 for receiving and placing telephone calls to establish data communication sessions with individual in-vehicle systems 105.

An in-vehicle system 105 initiates a communication session with server system 125 by placing a cellular telephone call to a telephone number associated with the server system. The call is routed through a cellular telephone network 350 to public switched telephone network (PSTN) 340 and then to telephone interface 320. Telephone interface 320 answers the call. Telephone interface includes a modem function which is used to establish a data connection with modem 256 (FIG. 2) in the calling vehicle. In alternative versions of the system, telephone interface 320 may be coupled directly to cellular telephone network 350. Also, the data signal may be demodulated prior to reaching the server system, for example, in the telephone network itself.

The server system can similarly establish a data communication session with a particular vehicle by placing a telephone call to the telephone number associated with that vehicle. Cellular transceiver 254 (FIG. 2) determines whether the inbound call is a data call from the server system or a voice call intended for voice communication with the operator of the vehicle. A data call is connected to modem 256 (FIG. 2) providing a data connection between telephone interface 320 and modem 256.

Server system 125 also includes a GPS receiver 325. GPS receiver 325 receives signals from GPS satellites 140. Server system 125, which is at the known location of centralized server 120, does not rely on GPS receiver 325 to determine its location. Rather, server computer 310 provides its known location (i.e., latitude and longitude) to GPS receiver 325. Using the satellite signals and the known location of the server, GPS receiver 325 provides in return GPS correction data, for instance, "differential" pseudorange correction data provided according to the Radio Technical Commission for Maritime Services (RTCM) standard RTCM SC-104. This correction data is used to improve the locations estimates of vehicles 100, as is described more fully in Section 2.4.

Server computer 310 includes a processor 312, working memory 314, and static storage 316. Static memory 316 includes storage for map-related information that is used by the server system in computing routes.

Server computer is coupled to external information systems 130. For instance, external information systems can be other computers coupled to server system 125 over a data network 330, such as the Internet.

Server system 125 receives map information from map provider 160 on a removable computer medium 360, such as a optical disk (e.g., CD-ROM). Server computer 310 reads this map data and stores a processed form of the map information in static memory 316 for further use. Alternatively, map provider 160 can provide the map information to the server system in some other way, for example by passing it to the server system over data network 330.

2.3 Map Database

The in-vehicle and server systems make use of data derived from map information furnished by map provider 160 on computer medium 360 (FIG. 3). The raw map information furnished by map provider 160 includes various types of information related to the road network for a particular geographic region, such as a portion of the United States. Within this region, the information includes a representation of the road network as a graph as illustrated in FIG. 7. Links in the graph correspond to segments of the road network, for example, a segment of a street between two intersections. Nodes in the graph correspond to intersections or other points at which two or more links join. Nodes that couple only two links are used, for example, as "shape points" when a single roadway makes a turn. This allows roadway to be well approximated by sequences of straight segments.

The map information includes the locations of nodes in the graph, in terms equivalent to their latitude and longitude. The map information also includes link information, including associations of street names and links, and ranges of street numbers on links. Links are also categorized according to their size ranging from small residential streets to interstate highways.

An example of a map provider for this system is Navigational Technologies Inc. (NavTech) of Rosemont, Ill. The map information is provided in one of a number of interchange formats, such as in the Geographic Data File (GDF) format, an international standard format. A map in GDF format includes a data structure which associates links and nodes and their attributes, and relationships between nodes and links in the graph. NavTech provides maps in which road links are categorized by classes from 0 to 4, with 0 for residential (side) streets, 1 for main streets, 2 for arterial roads, 3 for freeways, and 4 for interstate highways.

In alternative versions of the system, other forms of map information that can be converted to a link and node representation of a road network can alternatively be used.

2.4 GPS and DGPS Correction

As outlined above, both the in-vehicle and server systems include GPS receivers. GPS positioning uses the ranges to multiple satellites that are in precisely known orbits around the earth. A constellation of approximately 24 satellites is in such known earth orbits. A receiver at any point on or near the surface of the earth is typically in range of a subset of three or more of the satellites. A GPS receiver determines an estimate of its distance or range (a pseudorange measurement) to each of the subset of in-range satellites. It then computes its three-dimensional coordinates with reference to the known coordinates of each of the subset of satellites to which it determined pseudorange measurements. Based on straightforward geometric consideration (i.e., intersections of spheres) four pseudorange measurements are sufficient to uniquely determine the coordinates of the receiver. Three measurements are sufficient to determine that the receiver is at one of two possible points, and typically, only one of the points is reasonable (e.g., it is on the surface of the earth rather than in outer space). Using three pseudorange measurements, a GPS receiver can determine a two-dimensional location on the surface of the earth with an accuracy of approximately 100 meters.

The pseudorange measurements are not, however, completely accurate measurements of the distance from the receiver to the satellites due to several factors. First, signal propagation speed from a satellite to a GPS receiver can vary due to variations in atmospheric conditions. Also, the transmitted signals are intentionally manipulated by introducing varying time delay at the transmitter in order to limit the accuracy of location estimates based solely on the pseudorange measurements at the receiver.

As a method of overcoming the inaccuracies in the pseudorange measurements, differential GPS (DGPS) is used. Differential GPS is based on receiving signals from GPS satellites at a receiver that is at a known location. The difference between a pseudorange measurement from a satellite to that receiver and a computed distance between the location of the satellite and the location of the receiver is a pseudorange correction term for that satellite. Separate pseudorange correction terms are computed for each satellite. To the extent that propagation is slowly varying and the intentionally introduced delays are also slowly varying, a pseudorange correction term for a satellite can be used to correct further pseudorange measurements from that satellite for a short period of time relative to the rates of variation, for example for one minute. Also, to the extent that variations in propagation speed are not geographically local, a pseudorange correction term can be applied at a GPS receiver that is at a different location than the GPS receiver at which the correction term was computed.

In the vehicle information system, three approaches to differential GPS correction are used. A first approach is generally known as "inverted DGPS." In this approach, an in-vehicle system sends the pseudorange measurements, or other raw GPS data that is related to the pseudorange measurements, that it obtains from its GPS receiver to the server system over the cellular telephone link. The server system applies the differential correction terms it previously obtained from its own GPS receiver to the received pseudorange measurements it receives from the in-vehicle system and the server system calculates a corrected location for the vehicle.

In a second approach to GPS location estimation, the server system transmits pseudorange correction data to an in-vehicle system. The in-vehicle system provides the received correction data to its GPS receiver which then outputs improved location estimates based on its raw pseudorange measurements and the pseudorange correction data.

A third way that differential GPS is used in the system is for an in-vehicle system to determine its own pseudorange correction data based on its own location estimate. For instance, when an in-vehicle system detects that the vehicle is at a known maneuver point along a planned route, it computes the pseudorange correction data based on the downloaded location of the maneuver point. The differential correction data is then used for a period of time after the maneuver point is passed.

An alternative mode of correction of GPS location estimates computed by the in-vehicle system uses correction data in terms of differences in latitude and longitude rather than differences in pseudorange measurements. For instance, the server system can provide GPS correction data that includes an offset in latitude and in longitude that the in-vehicle system adds to the latitude and longitude location estimates output from its GPS receiver. If this type of GPS correction is used, the in-vehicle GPS receiver does not have to have a differential GPS capability since the location correction is performed on the output of the GPS receiver, rather than as part of the process of computing a location estimate in the GPS receiver.

Figure 4A:
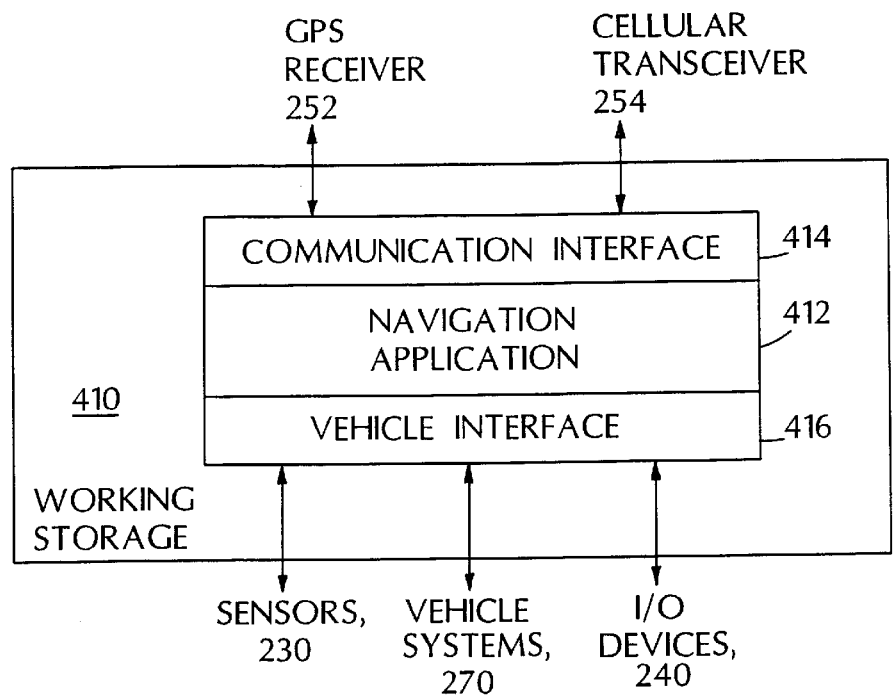
FIGS. 4A–B show an in-vehicle system software architecture.
Figure 4B:
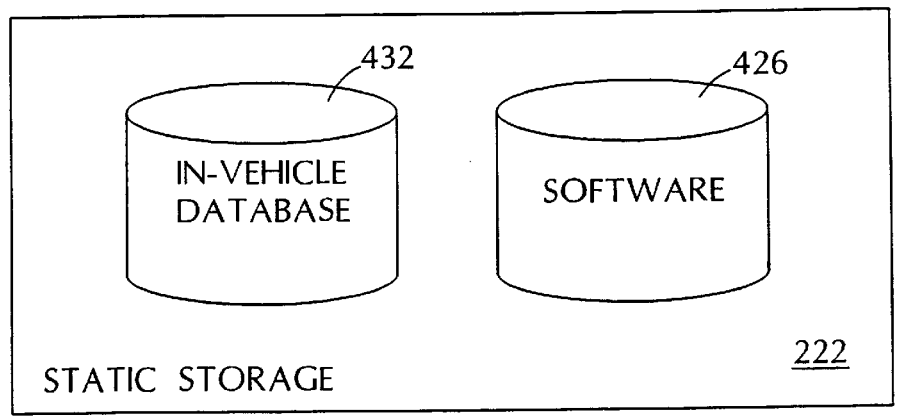

2.5 In-Vehicle Software Components (FIGS. 4A–B)

Referring to FIGS. 4A–B, software components of in-vehicle system 105 which execute on onboard computer 210 (FIG. 2) include relatively static data stored in static storage 222, and code stored in working storage 410, which is made up of some combination of DRAM 220 and EPROM 218 shown in FIG. 2.

Static data includes in-vehicle database 432 and software 436. Code in working storage 410 includes a navigation application 412, a communication interface 414, and a vehicle interface 416. Communication interface 414 provides an interface between navigation application 412 and GPS receiver 252 and cellular transceiver 254. Vehicle interface 416 provides an interface between navigation application 412 and sensors 230, vehicle systems 270, and I/O devices 240.

2.5.1 In-Vehicle Database 432 (FIGS. 11–14)

In-vehicle database 432 is used by in-vehicle system 105 for two principle functions. First, in-vehicle system 105 uses in-vehicle database 432 in the destination specification phase in which the database is used to determine alternatives to present to the operator, and to validate inputs from the operator. Second, in-vehicle system 105 uses in-vehicle database 432 during the guidance phase when the in-vehicle system detects that the vehicle is off route and it must plan a new route.

For the destination entry phase, database 432 includes tables that are used by the in-vehicle system to determine the names of known cities, the street names of streets in those cities (including residential, or side, streets), and the valid street address numbers on those streets. The database also includes tables that specify types of points of interest, and the points of interest of a particular type near a vehicle's location or in a particular city.

For the guidance phase, database 432 includes additional tables that the in-vehicle system uses to plan a route from a determined location (latitude and longitude) to a desired destination or an intermediate point on a previously planned route. For instance, the main roads network 1000 (FIG. 10) is stored in data tables in in-vehicle database 432.

Figure 11:
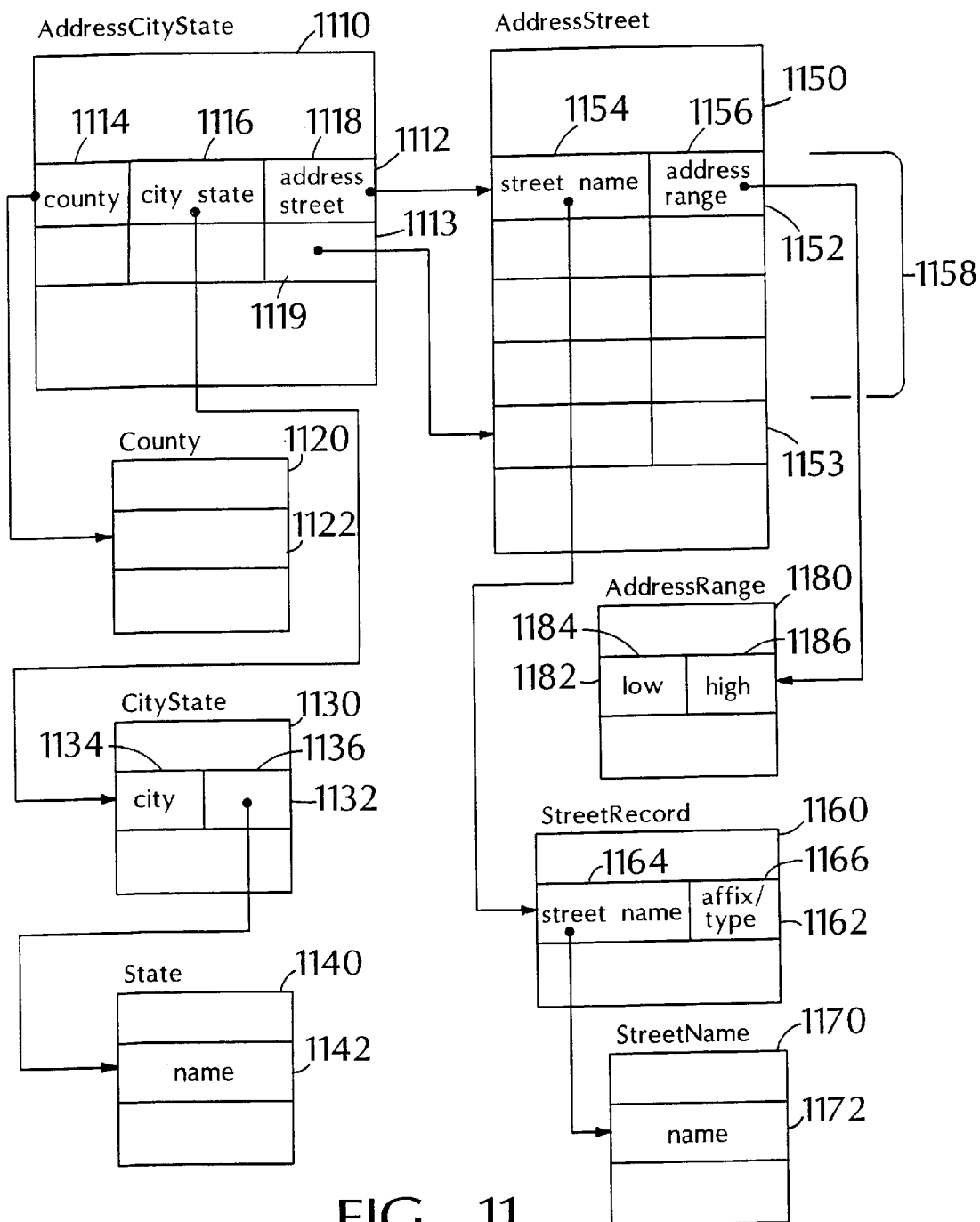
FIG. 11 shows data structures of an in-vehicle database.

Referring to FIG. 11, an AddressCityState table 1110 in in-vehicle database 432 includes a series of records that associate (Country, State, City) combinations with a series of (Street, Address Range) combinations. A typical record 1112 in AddressCityState table 1110 includes a Country field 1114 that references the name of a country in a Country table 1120. Country table 1120 holds the text representations of the names of known countries, such as "United States" or "Canada." Record 1112 also has a CityState field 1116 which is a reference to a CityState table 1130 that is used to determine the text representation of a city and state in the country referenced by Country field 1114. Record 1112 also includes an AddressStreet field 1118 that references the first of a range of records 1158 in an AddressStreet table 1150. Directly after record 1112 in AddressCityState table 1110, a record 1113 includes an AddressStreet field 1119 that references the next record 1153 after range 1158, thereby defining the records in range 1158.

Each record in AddressStreet table 1150 is associated with a combination of a complete street name, and a range of valid street numbers for that street name. Multiple records in AddressStreet table 1150 can refer to the same street name in order to build up an entire range of valid street numbers. A typical record 1152 in AddressStreet table 1150 includes a Streetname field 1154 and an AddressRange field 1156. Streetname field 1154 references a record in a StreetRecord table 1160 that is used to form the text representation of the street name. AddressRange field 1156 references a record 1182 in AddressRange table 1180 that includes entries for the lowest 1184 and highest 1186 numerical values in a valid range of the street numbers for the associate street.

StreetRecord table 1160 is used to form completely specified street names in terms of base street names, optional prefixes and suffixes, and street types. For instance, "North Main Blvd" is represented by the base street name "Main," the prefix/suffix combination "North/—" and the street type "Blvd." A typical record 1162 in StreetRecord table 1160 includes a StreetName field 1164 that references the text form of the base street name stored in a StreetName table 1170, and an AffixType field 1166 that includes a representation of the prefix/suffix combination as an index to the predetermined set of prefix/suffix combinations and a text representation of the street type.

Referring back to record 1112 in AddressCityState table 1110, CityState field 1116 references a record 1132 in CityState table 1130. Record 1132 includes a City field 1134 that encodes the text representation of the name of the city, and a State field 1136 that references a record 1142 in a State table 1140 that encodes the name of the state.

Figure 12:
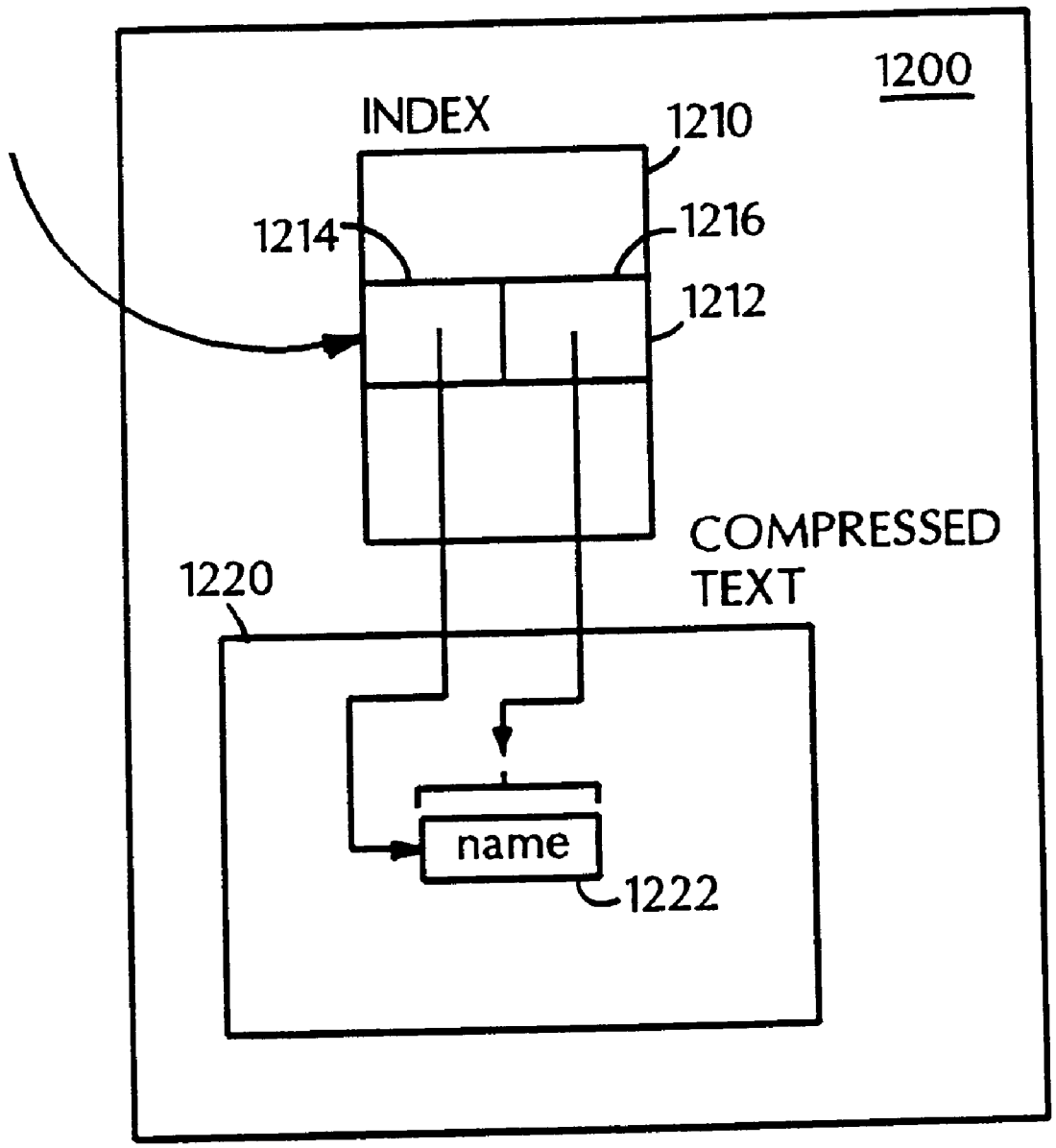
FIG. 12 shows the structure of text tables in the in-vehicle database.

Several tables shown in FIG. 11 store lists of text names. These include Country table 1120, StreetName table 1170, State table 1140, and CityState table 1130. In FIG. 11, references to records are shown as providing a direct access to the stored text representations. Referring to FIG. 12, a representative text table 1200 includes an index 1210 and a compressed text region 1220. A reference to a particular record is used as an offset to a record 1212 in index 1210. Record 1212 includes a starting field 1214 and a length field 1216. Compressed text 1220 includes the concatenation of all the text records, encoded as a sequence of 6-bit character representation. Starting field 1214 is the index of the starting 6-bit character of the record. In order for a procedure executing on onboard computer 210 to access the text string, the procedure first converts the index to the address of the starting 8 bit byte of storage, and then it unpacks the 6-bit character representation to form a standard 8-bit character representation of the record.

Figure 14:
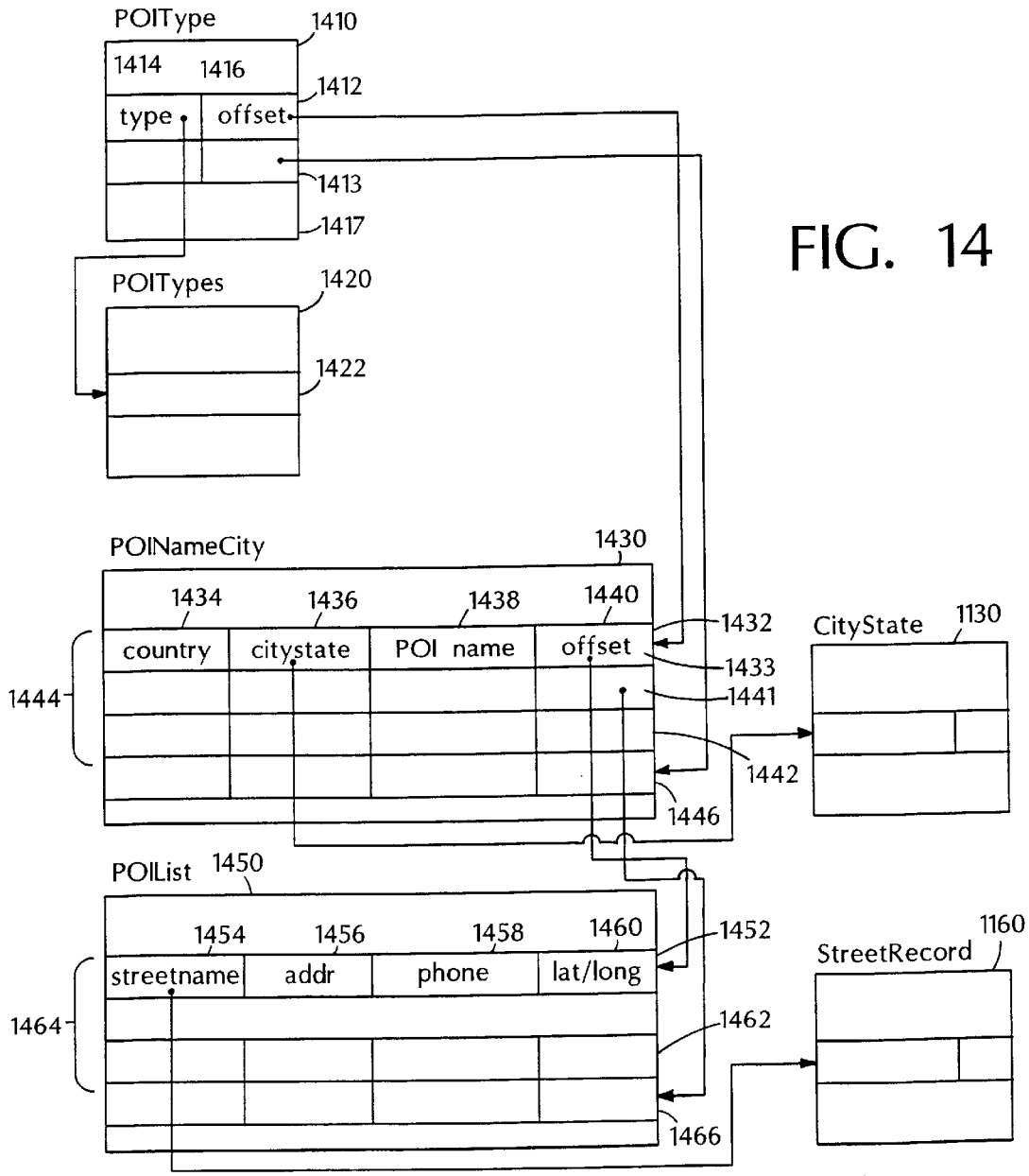
FIG. 14 shows elements of an in-vehicle database which encode Points of Interest information.

Referring to FIG. 14, an additional set of tables supports entry of a destination in terms of a "point of interest" (POI). Points of interest are divided by type, such as "restaurants," "ATM machines," and "gas stations." A POIType table 1410 includes a sequence of records. A typical record 1412 in POIType table 1410 includes a Type field 1414 that references a record 1422 in a POITypes table 1420. Record 1422 is a text representation of the type of POI.

Record 1412 of POIType table 1410 includes an Offset field 1416 that references a first record 1432 of a range 1444 of records in a POINameCity table 1430. An Offset field 1417 of a record 1413 that immediately follows record 1412 in POIType table 1410 references a record 1446 in POINameCity table 1430 that immediately follows range 1444 of records in POIType table 1410.

Record 1432 in POINameCity table 1430 includes a Country field 1434, which references a record in Country table 1120 (FIG. 11), a CityState field 1436, which references a record in CityState table 1130, a POIName filed 1438, and an Offset field 1440, which references a record 1452 in a POIList table 1450 which is the first record in a range 1464 of records in POIList table 1450 associated with record 1432. An Offset field 1440 of a record 1433 that immediately follows record 1432 in POINameCity table 1430 references a record 1466 that immediately follows range 1464 in POIList table 1450.

Record 1452 in POIList table 1450 includes a StreetName field 1454, which references a record in StreetRecord table 1160, an Address field 1456 that encodes the street number associated with the address of the point of interest, a PhoneNumber field 1458 which encodes the telephone number of the point of interest, and a Latitude/Longitude field 1460 which encodes the latitude and longitude of the point of interest.

Additional tables are included in in-vehicle database 432 to support other forms of destination specification. In versions of the system that support destination specification in terms of a "Yellow Pages" (telephone directory) category, in-vehicle database 432 includes a text table of "Yellow Pages" categories. In versions of system that support destination specification in terms of a pair of intersecting roads, a table of valid cross-street combinations is included in in-vehicle database 432. If a table of cross-street combinations is included, the table can alternatively include only intersections of main streets, or additionally include intersections of main streets and smaller residential streets, or even intersections of pairs of residential streets, if sufficient storage is available in the in-vehicle system.

Figure 13A:
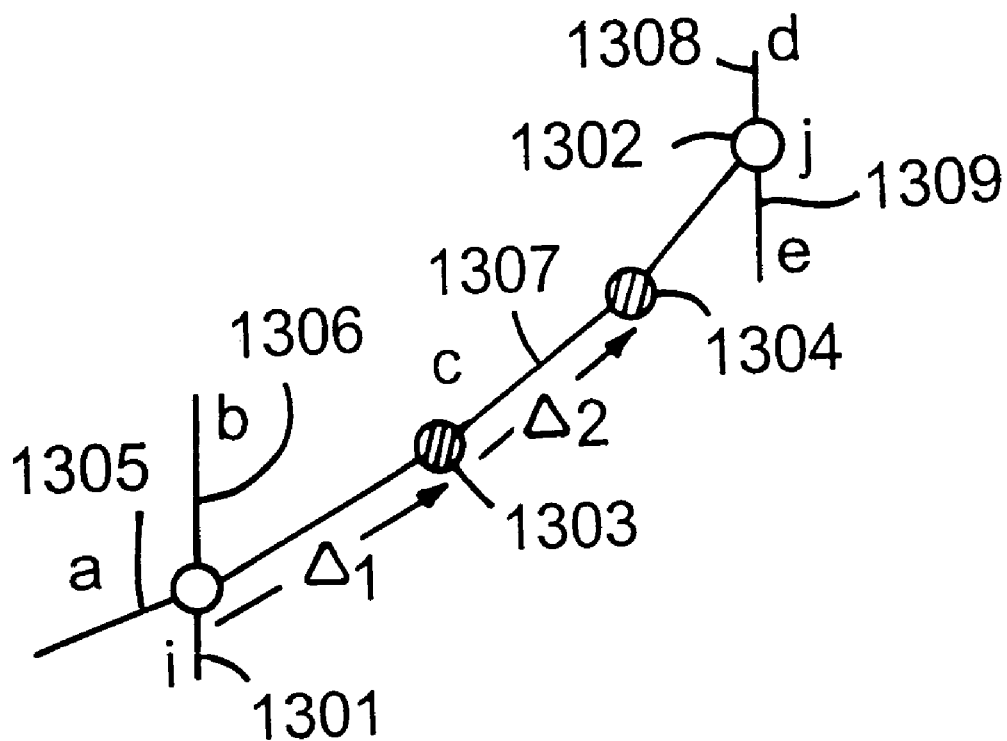
FIG. 13A shows a representative link of a main roads network.

Additional tables in in-vehicle database 432 (FIG. 4) are used during the guidance phase when the vehicle is determined to be off route. In particular, these tables encode main roads network 1000 (FIG. 10). Referring to FIG. 13A, a representative link of main roads network 1000 joins a node i 1301 and a node j 1302. Link c 1307 joins nodes i 1301 and j 1302. Link c 1307 includes two shape points 1303 and 1303. Node i 1301 is also connected to links a 1305 and b 1306 and node j 1302 is also connected to links d 1308 and e 1309.

Figure 13B:
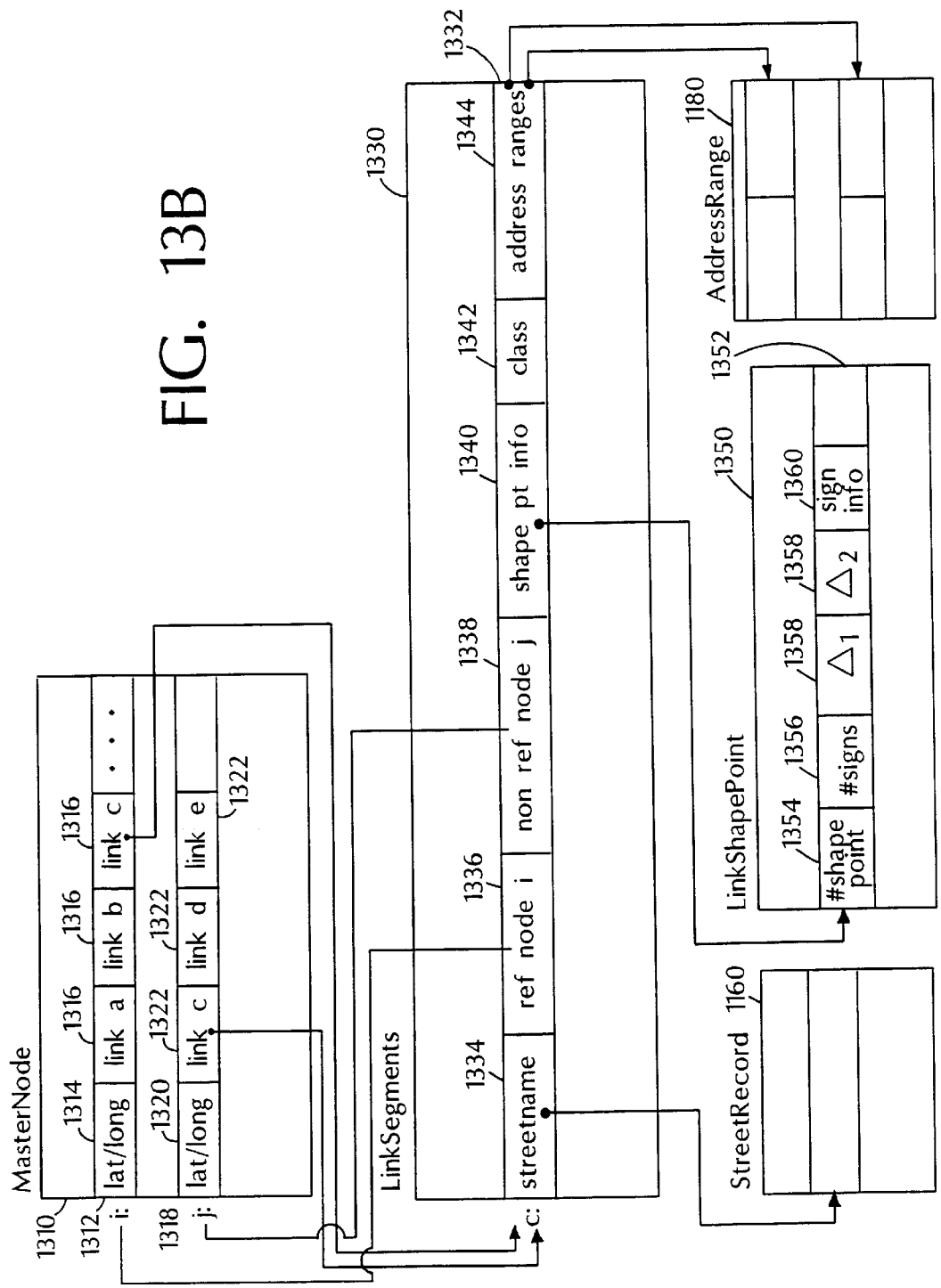
FIG. 13B shows data structures of an in-vehicle database encoding a main roads network.

Referring to FIG. 13B, several tables are used to represent the main roads network 1000. Records in these tables related to the representative link shown in FIG. 13A are illustrated in FIG. 13B. A MasterNode table 1310 includes one logically variable length record for each node in the network. A record 1312 which is associated with node i 1301 includes a Latitude/Longitude field 1314 that encodes the location of node i 1301. Record 1312 also includes a set of link fields 1316, one for each of the links joined at node i 1301. Each link field 1316 includes information related to allowable turns from that link onto other links at that node, and includes a reference to a record in a LinkSegments table 1330 associated with that link. For instance, the link field 1316 associated with link c 1307 references record 1332 in LinkSegments table 1330.

Record 1332 in LinkSegments table 1330 includes a StreetName field 1334, which references a record in StreetRecord table 1160, and a reference node field 1336 and a non-reference node field 1338 which reference records 1312 and 1318 in MasterNode table 1310, respectively. Record 1332 also includes a ShapePointInfo field 1340 which references a record 1352 in a LinkShapePoint table 1350. The record referenced by ShapePointInfo field 1340 includes information related to the shape points on the link, as well as information related to signs on the link. Record 1332 also includes a Class field 1342, which encodes the road class of the link, and an AddressRanges field 1344, which references two records in AddressRange table 1180, one for each side of the road.

Record 1352 in LinkShapePoint table 1350 includes a NumberShapePoints field 1354 and a NumberSigns field 1356. For each shape point, record 1352 includes an encoding of the change in latitude and longitude from the previous shape point, or from the reference node for the first shape point. Record 1352 also includes SignInformation 1360 describing the signs that would be seen by someone driving along the link.

Figure 5:
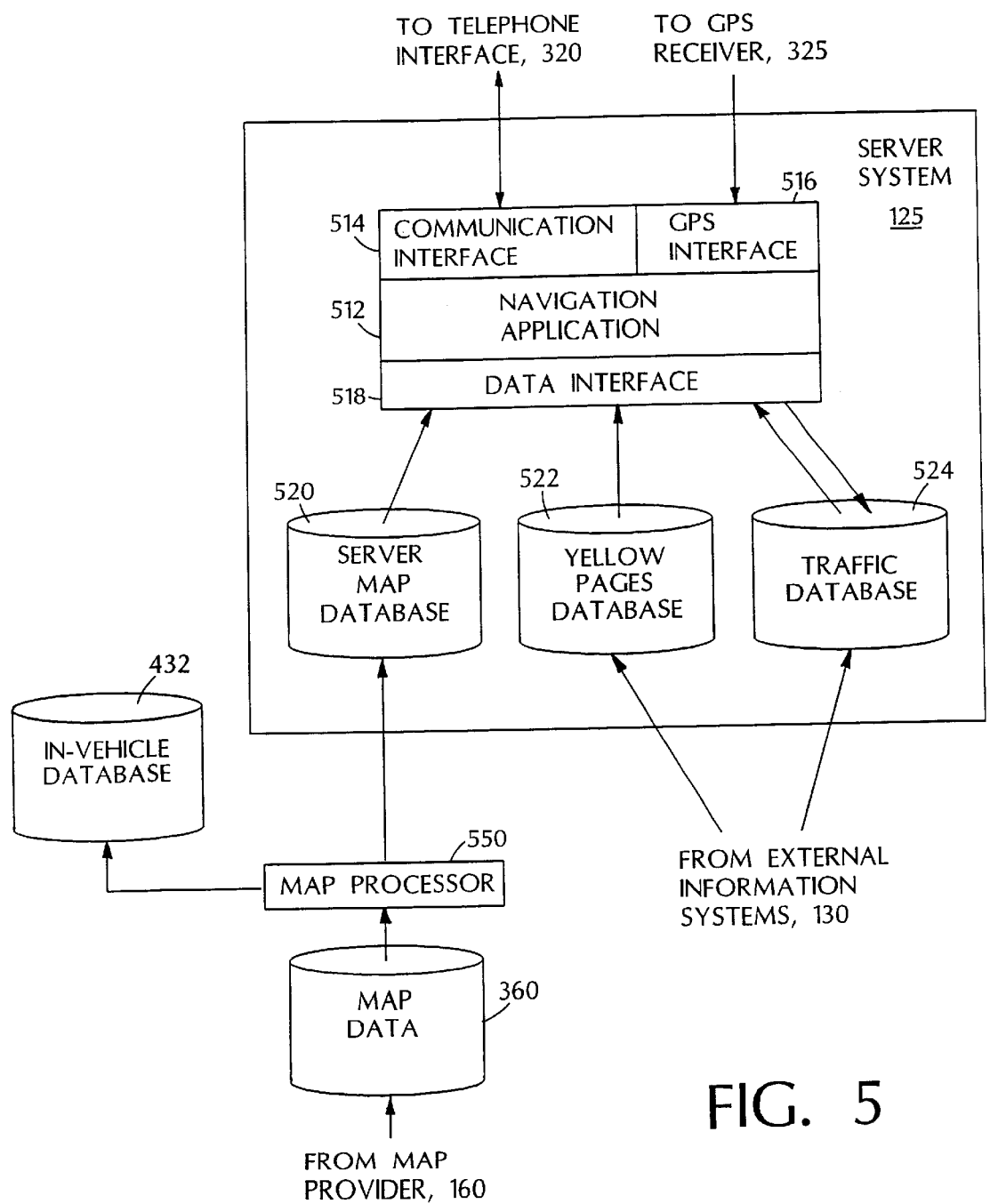
FIG. 5 is a block diagram of a server system software architecture.

2.6 Server Software Components (FIG. 5)

Referring to FIG. 5, server system 125 includes software that executes on server computer 310 (FIG. 3). This software includes a navigation application 512, which is used to interact with the in-vehicle systems. Navigation application 512 is coupled to a communication interface 514, which is used to communicate with telephone interface 320 (FIG. 3). Navigation application is also coupled to a GPS interface 516 that is coupled to GPS receiver 325 (FIG. 3).

Navigation application 512 also makes use of a number of databases that it accesses through a data interface 518. Server system 125 includes a server map database 520 that includes the complete road network 700 (FIG. 7). This database is derived from map information 360 provided from map provider 160. The map information is processed by a map processor 550 that reformats the map information to form server map database 520. The same map information is used to derive the map information that is stored in the in-vehicle databases 432 in the vehicles. Map processor 550 can be implemented as a software module that executes on server computer 310, or can alternatively execute on some other computer allocated to the reformatting task. By deriving both the server map database and the in-vehicle map database from the same map information, consistency between the in-vehicle and the server data is guaranteed.

Navigation application 512 also makes use of a yellow pages database 522 that it uses to convert the telephone number of a desired destination to a street address in a "reverse" number lookup. The information needed to construct yellow pages database 522 is provided by an external information system 130, such as a telephone company or a publisher of telephone directories.

Navigation application 512 also makes use of a traffic database 524. Information in traffic database 524 includes typical link speeds that it uses for route planning. The information comes from a combination of an external information system 130, such as from a government run traffic monitoring authority, and from logging data obtained from probe vehicles (see Section 3.5). If probe vehicles are used to collect traffic information, then traffic information can also be provided by the server system to the external traffic information system.

3 System Operation FIGS. 15A–B and 16–18

3.1 General Procedure

System operation involves cooperation between in-vehicle system 105 and server system 125 (see FIG. 1). The procedure followed from the time at which an operator of a vehicle begins specifying a destination to the time at which the vehicle reaches the specified destination is illustrated in the pseudocode listing in FIGS. 15A–B and 16–18.

Referring to FIG. 15A, the procedure followed by in-vehicle system 105 (FIGS. 1,2) from the time at which the operator begins specifying the desired destination to the time that the in-vehicle system can begin guiding the operator to the destination shown. The in-vehicle system first accepts a destination specification from the operator (line 1502). This can take several separate interactions with the operator, for instance the operator selecting a city, then a street, and then a street number. Various types of destination specification procedures are supported by the system, as described further below (see Section 3.2.1)

The in-vehicle system also determines the vehicle's initial location or data related to the vehicle's initial location, and in some versions of the system the orientation of the vehicle (line 1503). The location or location-related data includes one or more of (a) a GPS location estimate or pseudorange measurements obtained at the time that the navigation request is being made, (b) past GPS-based location estimates, and (c) dead-reckoning from previous GPS-based location estimates or from maneuver locations. Starting location estimation is discussed further below (see Section 3.2.2)

After having accepted the destination specification from the operator, and location data related to the vehicle's current location, the in-vehicle system establishes a communication session with the server system (line 1504). The in-vehicle system establishes the communication session by making a cellular telephone call to the server system and then establishing a data communication session with the server system using its modem.

The in-vehicle system then sends the location data and the destination specification to the server system (line 1505).

Referring now to FIG. 15B, the server system accepts the communication session from the vehicle (line 1552) and receives the location data and the destination specification (line 1553).

The server system receives signals from multiple GPS satellites 140 and computes GPS correction data for each of the satellites (line 1554). The server system then determines the vehicle's location (line 1555). In determining the vehicle's location, if the in-vehicle system provided raw GPS data, such as pseudorange measurements to GPS satellites 140, the server system applies the GPS correction data it has computed to the raw GPS data that the vehicle provided to compute the vehicle's location.

In alternative versions of the server system, the server's GPS receiver (or at least its GPS antenna) is not necessarily located at the centralized server. For instance, the centralized server can be some distance from the vehicles. The GPS receiver and antenna are located nearer to the vehicles than the centralized server. This makes the GPS correction data more accurate since the server system's GPS receiver is then closer to the vehicles at which the GPS location estimates are being estimated. Also, a server system can have multiple GPS receivers in different locations. The server system then chooses the closest GPS receiver to a vehicle for which it is providing correction data. In this way, a single server system can service vehicles in a wide geographic area over which common GPS correction data may not be effective due geographic variations in the correction terms.

For certain types of received destination specifications, and in particular, a destination specification in terms of a class of "yellow pages" categories, the destination is not fully specified at this point. If this is the case (line 1556) then further operator input may be required in response to secondary specification data provided by the server system. The server system sends the secondary data to the vehicle (line 1557). For instance, if the operator specified the destination in terms of a yellow pages category, the server system provides secondary data with the specific listings in that category that are near the vehicle's location.

Referring back to FIG. 15A, the in-vehicle system accepts the secondary destination specification data (line 1507). Using this data, the in-vehicle system presents the data to the operator and accepts a secondary destination specification from the operator, for instance as a choice from the list of destinations defined in the secondary specification data. The secondary destination specification is sent to the server (line 1509). At this point, the server system has a completely specified destination.

Turning back to FIG. 15B, the server system now determines a route (see Section 3.2.4) from the vehicle's location to the specified destination (line 1561). The server system also determines a spot map around the vehicle's location that it will download to the vehicle (line 1562). The server system also determines whether to download spot maps around maneuver points, for instance, based on the complexity of the maneuvers, and determines the spot maps around those maneuver points.

The server system sends the planned route, the spot map, and the GPS correction data to the in-vehicle system (line 1563).

Referring back to FIG. 15A, the in-vehicle system receives the planned route, spot map, and GPS correction data from the server system (line 1512) and closes the communication session with the server (line 1513).

Referring now to FIG. 16, the vehicle is now prepared to guide the operator in a startup maneuver from its initial location onto the planned route. First, the in-vehicle system initializes its estimated location. The server system provided GPS correction data that the in-vehicle system provides to its GPS receiver in order to increase the accuracy of the location estimates provided by its GPS receiver. The GPS correction data that the server system provided is only valid for a short time. After an interval of approximately one minute from the time the GPS correction data was obtained by the server system from its GPS receiver, the in-vehicle system stops using the correction data and uses standard GPS instead. As is discussed further below, GPS correction data may be obtained at other times during a trip, and in such cases, the in-vehicle system provides the correction data to its GPS receiver for a fixed interval from the time that the data was generated by a GPS receiver.

During the startup maneuver, which is the initial portion of the trip until the vehicle is following the planed route, the in-vehicle system tracks the location of the vehicle using the differential GPS location estimates until the GPS correction data is too old, and then tracks the vehicle using uncorrected GPS location estimates (line 1604). The in-vehicle system displays the spot map along with an indication of the vehicle's estimated location and a representation of the planned route (line 1605). When the in-vehicle system detects that the vehicle is following the planned route, the startup maneuver phase is completed and a turn-by-turn route following phase begins.

Referring now to FIG. 17, the route following procedure is based on notifying the operator of each of the links along a planned route. While traveling along the route, the in-vehicle system maintains two location estimates for the vehicle. The first is based on GPS estimates, or on DGPS estimates if current GPS correction data is available. The second location estimate is based on a "dead reckoning" procedure. This procedure assumes that the vehicle is properly following the planned route. The dead reckoning uses the locations of the maneuver and way points along the planned route and information from the vehicle sensors, in particular, from the velocity sensor, to update this second location estimate. If the vehicle is truly following the route, then the two location estimates should remain close to one another. Note that this dead reckoning procedure does not need to use heading estimates to track the vehicle's position since the vehicle is assumed to be traveling along the planned route.

Along each link, after the initial maneuver at the starting node of the link, the in-vehicle system initializes an off-route tolerance. This tolerance is the allowable disparity between the GPS and the dead reckoning location estimates. The tolerance grows from an initial value established right after a maneuver to account for a growing inaccuracy in the estimates, due, for instance, to calibration inaccuracies in the velocity sensor and aging of the GPS correction data. The off-route tolerance is initialized to 150 feet and grows linearly to a maximum of 500 feet at a rate of about 1 foot per 100 feet traveled.

While traveling to the next maneuver point (loop starting at line 1704), the vehicle increases the off route tolerance (line 1705), tracks its dead reckoning position (line 1706), and tracks its GPS or DGPS position (line 1707) (depending of whether current GPS correction data is available).

If at any time the difference between the dead reckoning position and the (D)GPS based position is more than the off-route tolerance, then a off-route routine is initiated (line 1710).

While traveling along a link, the vehicle eventually reaches a point near the next maneuver. When the vehicle is estimated to be within a distance window of the next maneuver, then the operator is notified by the in-vehicle system using graphical and aural output of the upcoming maneuver. The size of the notification window depends on the road class being traveled on, which is related to the time prior to a maneuver that an operator is notified of the maneuver. For instance, on a highway, an operator is notified of a maneuver, such as exit from the highway, at a farther distance from the maneuver that the distance than from a maneuver in a residential neighborhood.

Also while traveling along the link, the in-vehicle system attempts to detect the precise point at which the next maneuver is carried out. When the vehicle is within a distance window of the next maneuver, the in-vehicle system attempts to detect the maneuver. For instance, if the maneuver involves making a right angle turn, the signals from the in-vehicle sensors, such as from a magnetic compass or a rate gyroscope, or from successive GPS location estimates from which changes in directions are detected, provide a clear indication of the maneuver point.

If a maneuver is detected (line 1718) then the in-vehicle system updates its dead reckoning location estimate based on the location of the maneuver (line 1719). Also, the in-vehicle system uses the downloaded location of the maneuver point to compute its own GPS correction data (line 1720). In particular, the in-vehicle system computes the deviation in latitude and longitude at the maneuver point and applies these deviations as corrections to the latitude and longitude position estimates output from its GPS receiver for a one minute interval after the maneuver. Alternatively, the in-vehicle system uses the location of the maneuver point and the pseudorange measurements obtained by the vehicle's GPS receiver at the time of the detected maneuver to compute new GPS correction data that are used for a one minute interval after the maneuver.

Note that there are times when a maneuver is not detected, for instance if it involves only a slight turn that is not accurately detected using the vehicle sensors. In such a case, the in-vehicle system continues the dead reckoning procedure under the assumption that the vehicle has stayed on route. Such maneuver points that are not detected are essentially treated in the same way as way points from the point of view of tracking the dead reckoning location of the vehicle.

The route following procedure continues from link to link along the route until the destination is reached (line 1725).

Referring now to FIG. 18, the off-route routine first involves a dead-reckoning position correction procedure (lines 1802–1810). If for the direction of travel matches the planned route for an interval, for instance, of 75 feet after the difference between the position estimates was detected, then the dead reckoning position is updated to be the closest point along the planned route to the (D)GPS position estimate (lines 1804–1805). In this way, if the deviation in position estimates is due to inaccurate tracking of the distance along the route, the location correction procedure should successfully overcome the error. If the deviation between the (D)GPS estimate and the dead-reckoning estimate is now less than the off-route tolerance, the in-vehicle system resumes the route following procedure (line 1808). If on the other hand, even the closest point on the planned route is still more than the off-route tolerance from the (D)GPS position, then the location correction procedure is not successful and a route replanning procedure is initiated.

Referring still to FIG. 18, the route replanning procedure involves first estimating the vehicle's location on main roads network 1000 (FIG. 10) that is stored in the vehicle. The GPS location estimate is used to find a link along which the vehicle is traveling (line 1811).

Once the vehicle has been located on the main roads network, the in-vehicle system calculates a best route that leads to one of the maneuver or way points along the previously planned route (line 1813).

The newly planned route to the maneuver or way point on the previous route, along with the remaining portion of the previously planned route then becomes the new planned route which replaces the previous one (line 1815). The link-by-link route following procedure is then reentered (line 1816).

Specific aspects of the general operation of the system are described in the following sections. These aspects includes route planning, including in-vehicle destination specification as well as computation of the best route at the server system. The specific aspects also include the guidance operations carried out by the in vehicle system, as well as route replanning operations carried out by the in-vehicle system when it detects that the vehicle is off route. In addition, operation of the system in which the fleet of vehicles is used to collect traffic related data is described below.

3.2 Route Planning (FIGS. 15A–B)

Route planning involves several steps, as shown in FIGS. 15A–B. In particular, the route planning operation includes:

Destination specification (line 1502, FIG. 15A)

Starting location determination (line 1503, FIG. 15A)

Querying the server system (lines 1504–1510, FIG. 15A; lines 1552–1560, FIG. 15B)

Route planning (line 1561, FIG. 15B)

Route and spot map downloading (lines 1562–1563, FIG. 15B, line 1512, FIG. 15A)

Specific operations carried out by the in-vehicle and server systems in each of these steps are described in the following sections.

3.2.1 Destination Input

As shown in FIG. 15A (line 1502), the first phase of navigation to a desired destination is destination input by the operator of the vehicle. In-vehicle system 105 (FIGS. 1,2) enables the operator to specify a destination in a number of different ways. In general, the in-vehicle system uses in-vehicle database 432 (FIG. 4) to provide alternative in scrolling lists from which the operator chooses. A destination specification can be one of:

A street address (e.g., city, street, and number),

A point of interest (e.g., city, type of point of interest, and a selection from a list), A "yellow pages" listing (e.g., type of listing, and a selection from a list), A telephone number of the destination, A pair of cross streets, A selection from a list of recently specified destinations, and A selection from a list of previously stored destinations in a user's "profile".

In an initial interaction with the system, the operator first specifies what method of destination input will be used, for example, by selecting from a displayed list of choices.

3.2.1.1 Street Address Specification

One way that the operator can specify a destination is by the street address of the destination. The destination specification in this case is a fully specified (country, state, city, street, number) combination. The user does not necessarily have to enter each of these fields in turn. For instance, the current (i.e., previously used) country and state can be used as defaults.

Alternative sequences of field specifications can be used. In one sequence, the operator first selects a city from a scrolling list of cities in the current (country, state). Referring to FIG. 11, the list of valid states is obtained from CityState table 1130. After the operator selects a desired city, the in-vehicle system presents a scrolling list of valid streets names in that city. The list of valid street names is obtained using AddressCityState table 1100, and associated AddressStreet table 1150, StreetRecord table 1160, and StreetName table 1170. After the operator selects a desired street, the operator enters a street number. The in-vehicle system validates the number using AddressStreet table 1150 and AddressRange table 1180.

In the above procedure, alternative methods of selecting from lists of valid names can be used, including scrolling through a list using "up" and "down" buttons, and spelling a prefix of the name until it unambiguously specifies a full name. An alphanumeric keyboard is not necessarily provided with this system. If one is not provided, the operator enters letters of a spelling, or digits of a street address, by moving a cursor to a display of the desired letter or digit and selecting that letter or digit.

There are times when the city of the desired destination is not known. In that case, the city can be initially left unknown. The list of valid street names presented to the operator by the in-vehicle system is then all the streets in the current state. After the street name is selected, if the city is ambiguous, the operator selects from the list of possible cities and then proceeds to input the street number. Alternatively, disambiguation of the city of a destination street can be left until after a street number is also specified.

3.2.1.2 Point of Interest Specification

In specifying a destination by a point of interest (POI), the operator first selects from a list of types of points of interests. Examples of types of POIs include banking locations, gas stations, hospitals, and restaurants. Referring to FIG. 14, the list of valid types is obtained by the in-vehicle system from POITypes table 1420.

The operator can select a particular POI of the selected POI type in a number of ways. In a first way, the operator next selects a city in which to find the destination POI. Using POINameCity table 1430, the system displays a list of names, addresses and phone numbers of POIs of the selected type in the selected city. The operator then selects from the list of displayed POIs. The phone number can be useful, for instance, if the operator wants to call the destination, such as a restaurant, before deciding to travel to the destination.

Rather than specifying the city, the system can display the POIs by their proximity to the current location of the vehicle. The GPS-based latitude and longitude estimates are compared to the Latitude/Longitude field of records in POIList table 1450, for POIs of the selected POI type. The in-vehicle system then displays the POIs in order of proximity to the current location rather than alphabetically.

3.2.1.3 "Yellow Pages"

In order to support an operator specifying a destination to the in-vehicle system using "yellow pages" listings, the in-vehicle database 432 does not have the capacity to include all the possible listings that an operator may be looking for. Instead, only the categories of listings are included, for example, "jewelry stores." The in-vehicle system first displays a list of categories from which the operator selects a particular category. The operator then selects a particular destination city, or requests listings in the proximity of the current location. The in-vehicle system presents a list of categories to the operator and the operator selects from the list. Note that the destination is not completely specified at this point since a particular destination (i.e., a street address) has not yet been determined.

After the communication session with the server is established, the server downloads the specific listings in the selected yellow pages category to the in-vehicle system, either according to the selected city, or according to the proximity to the vehicle's location. The operator then selects from the downloaded list.

3.2.1.4 Other Destination Specifications

Several optional ways of specifying a destination can also be supported by in the in-vehicle system.

An operator can specify a destination by selecting a pair of cross streets. To support selection of a pair of cross streets, in-vehicle database 432 includes a table of valid pairs of main streets, and possible pairs of main and side streets or even pairs of side streets. The operator selects a first street. A list of valid cross streets are then displayed and the operator selects one from the list.

As in destination specification by street number, if the city is not specified before specifying the cross streets, the city is disambiguated after one or both of the street names are selected.

An operator can specify a destination by specifying the telephone number of the destination. A complete telephone directory is not stored in in-vehicle database 432, therefore, the validity of the telephone number, other than perhaps the validity of the area code, is not verified before the in-vehicle system establishes the communication session with the server system. The server system receives the telephone number and looks in up in a "reverse" telephone directory to determine the street address of the destination.

As is described further below, individual operators can have stored profiles that are stored in the vehicle and may have corresponding storage on the server system. This profile can hold typical destinations, such as "work," "home," "airport," etc. for which the operator has previously specified particular locations.

An operator can specify a destination by selecting from the most recently specified locations. For example, the operator may be returning to a recently visited work site.

Alternative versions of the system allow specification of a destination by street address, but the in-vehicle system does not have data with which to validate the address ranges for the specified street. For instance, the in-vehicle system may not have the capability to validate any street numbers, or the destination may be outside a geographic range for which it has stored address range data. If the in-vehicle system cannot validate the street address, it nevertheless establishes a communication session with the server computer. The server computer then completes the validation procedure.

3.2.2 Starting Location Determination

The in-vehicle system sends to the server system either an estimate of its position, or sends raw GPS data from its GPS receiver from which the server system computes the vehicle's position (line 1503, FIG. 15A).

There are situations in which the vehicle cannot receive signals from the GPS satellites at its starting location. For example, this would be the case if the vehicle were in an underground garage. In such a case, the vehicle relies on location estimates that the system made prior to reaching the starting location. Furthermore, after a GPS receiver is first powered on, there can be a significant interval before which it can provide location estimates. For example, the GPS receiver must locate each of the satellites that are in range, and compute their locations in orbit.

The in-vehicle system therefore maintains a history of GPS location estimates on an ongoing basis, even when the operator is not being guided along a route. This history is stored in a non-volatile memory in the in-vehicle system before the system is shut off. Therefore, if GPS signals cannot be received at the starting location, the latest GPS location estimate in the stored history is used.

In addition to sending location related data to the server system, the in-vehicle system also sends speed and orientation data. The orientation can be obtained from either past consecutive GPS location estimates, or from the magnetic compass. The speed and orientation information is used by the server system, for example, to disambiguate which of a number of nearby road segments the vehicle is on based on the class of road segments and the allowable directions of travel on those segments.

If the vehicle was guided to the starting location during a previous navigation session, the starting location can be based on dead reckoning along the previously planned route.

Once the server system provides GPS correction data to the in-vehicle system, the in-vehicle system updates its starting location using the GPS correction data (line 1602, FIG. 16). For instance, if the GPS correction data is pseudorange correction data, the in-vehicle system provides the pseudorange correction data to its GPS receiver and receives the corrected position estimate from the GPS receiver. If the GPS correction data is offsets in latitude and longitude, the in-vehicle system applies these offsets to the estimated position output from its GPS receiver.

3.2.3 Server Query

When the in-vehicle system establishes a communication session with the server system (line 1504–1510, FIG. 15A), it does so in two steps. First the in vehicle system establishes a cellular telephone connection to the server system, and then it establishes a modulated data session on the cellular telephone connection.

In the first step, the cellular telephone connection is established by the in-vehicle system dialing a specific number to reach the server system. The in-vehicle system can handle typical error conditions that might be found in an analog cellular telephone network, such as being out of range of the cellular system, or the cellular system not having the capacity to establish the call.

In the second step, once the telephone connection is set up, the in-vehicle system attempts to establish a data connection with the server system. Typical modems carry out a negotiation phase in which compatible modulation, compression, and error correcting protocols are selected. In order to reduce the time needed to set up the communication session, a particular set of protocols is preselected, for example as the "lowest" common protocol that all vehicles support. The server system expects communication using this lowest protocol. This allows data to flow as soon as possible without waiting for the protocol negotiation phase to be completed. Since the amount of data to be transferred is relatively small, the time taken in negotiating the best protocols would likely be larger than the time saved by sending the data using the negotiated protocol rather than with the preselected protocol.

3.2.4 Route Planning

Route planning at the server system (line 1561, FIG. 15B) uses well known route finding approaches. In particular, two instances of the well-known A* ("A-Star") graph search algorithm are used in conjunction with road network 700 (FIG. 700). One instance of the A* algorithm starts at the starting location and one starts "backwards" from the desired destination. The A* algorithm is a type of "best first" search approach. At any point executing the algorithm, the actual distance along the graph from an initial node to a set of intermediate nodes has been computed. A lower bound (or in some versions of the algorithm, an estimate) of the distance from each of the intermediate nodes to the final node is added to the actual distance. The intermediate node with the lowest sum is extended. If the lower bounds are used, this algorithm produces the shortest path from the initial node to the final node. Using the two instances of the A* algorithm, a best path is chosen after there are intermediate nodes in common for the two instances of the algorithm.

Alternatives to the A* route planning algorithms can be used. For instance, Dijstra's algorithm, or another type of best first algorithm can be used.

Route planning can be based on a variety of criteria. A shortest total distance uses the actual link distances in the road network to determine the cost of a path. The lower bound on the remaining path can be straight-line distance between an intermediate node and the final node. Route planning can alternatively be based on lowest expected travel time. Travel time along a link can be based on an expected speed for different road classes, or can be based on specific speed data stored on the server system and associated with particular links. For example, the server system may know that certain links are congested with slower than expected speeds for their road classes. The route planning algorithm would then tend to avoid such a congested link if there are alternative routes that can be taken.

Other alternative route planning approaches can also be used on the server system. For instance, routes can be constrained to follow particular road segments, and the cost of routes can include other factors than distance or expected travel time, such as toll fees along the route.

3.2.5 Route and Spot Map Download

Referring to FIGS. 8 and 9, the server system downloads a route as a sequence of links joined by maneuver points, and downloads spot maps as small graphs around the starting location or the selected maneuver points (lines 1562–1563, FIG. 15B, line 1512, FIG. 15A). In order to reduce the download time needed, this data is represented as a compact data structure.

The planned route is downloaded as a sequence of route links using a compressed format. For each link in the planned route, the downloaded information includes:

The latitude and longitude of the starting node (maneuver point) of the link, encoded as 32-bit integers in units of $10^{-5}$ degrees, Turn information, encoded as an index representing messages such as "turn right," "keep left," etc., The number of "arms" at the current maneuver point, The number of way points before the next maneuver, and The rank (e.g., the size or classification) of the road segment associated with this link.

In addition, for each way point, the data for a link includes:

The change in latitude and longitude from the previous way point, or from the starting node for the first way point, encoded as 12-bit integers in units of $10^{-5}$ degrees.

Note that 12-bit encoding of the change in latitude or longitude limits the change to approximately $2^{12} \times 10^{-5} = 0.04$ degrees. If a segment of the route planned by the server system includes a greater change between successive maneuver or way points, the server system inserts additional way points that are sufficiently close to encode the changes in the 12-bit quantities.

In addition, for each link, the downloaded data includes:

The length of text fields, if any, associated with the name of the street associated with the link, and the name of the street to be turned onto at the next maneuver point, and with any signage or other special information to be presented to the operator, and The text fields themselves.

For each "arm" at a maneuver point, the downloaded data includes data related to the angles at which the intersecting streets join at the maneuver point, thereby allowing a relatively accurate graphical representation of the maneuver to be displayed to the operator.

This route download format provides a compact representation that can be downloaded quickly from the server to the vehicle. Alternative versions of the system can take advantage of data in the in-vehicle database to reduce the amount of data still further, for example, by referencing stored street names or by using references to nodes in the main roads network that is already stored in the vehicle. Alternative versions of the system can also include additional information related to the links. For example, link travel speeds can be downloaded, particularly if the links are known by the server to be exceptionally congested.

An alternative approach to route downloading includes use of predefined sequences of road segments that are stored in the in-vehicle systems. The server system replaces an sequence of road segments, maneuver points, and waypoints, with a reference to the stored predefine sequence. In this way, typically traveled routes, for example, along a highway do not have to be downloaded explicitly. The server system can periodically update the stored sequences in the vehicles to reflect the typically requested routes by those vehicles. Alternatively, the in-vehicle system retains a memory of previously downloaded routes, and the server can refer to portions of those routes when downloading a newly planned route.

3.3 Guidance

Guiding the operator to the desired destination involves several aspects of operation of the in-vehicle system. These include:

A startup maneuver (FIG. 16),

Dead reckoning location tracking (FIG. 17, line 1706),

GPS location tracking and off-route detection (FIG. 17, lines 1707–1710), and Maneuver notification and detection (FIG. 17, lines 1712–1722).

These aspects are described in the following sections.

3.3.1 Startup Maneuvers

There are several reasons that an operator may not be able to follow an initial route. One is inaccuracy of the initial location of a vehicle. For instance, the GPS may indicate that the vehicle is on a street, when in fact it is in a nearby parking lot or an adjacent street. Also, if a vehicle is pointing in the opposite direction on a street than the server system expects, then the vehicle is likely to go off route right from the very first step. Also, following directions at the start of a route can be difficult, for instance, due to the close spacing of side streets, inadequate signs, distractions, traffic, etc.

For these and other reasons, the system does not rely on an operator making no mistakes right from the very initial starting location. Instead, the starting location is used to determine the spot map that is downloaded to the vehicle. The spot map typically covers only two or three intersections in any direction from the starting location. The planned route is shown in conjunction with the spot map, as is the vehicle's DGPS based location. The operator uses this map representation to get onto the planned route.

Once the vehicle is on a segment of the planned route, and traveling in the correct direction, the turn-by-turn guidance phase begins.

3.3.2 Dead Reckoning Location Tracking

Once the in-vehicle system enters the turn-by-turn route following (guidance) phase, the in-vehicle system maintains a dead reckoning location estimate of the vehicle. In general, the in-vehicle system tracks the vehicle under the assumption that the operator is trying to follow the instructions. Dead reckoning is based on converting the velocity signal from velocity sensor 232 and the straight line approximations of the links between maneuver or way points along the planned route into an updated location. In particular, if the in-vehicle system assumes that the vehicle is at a known maneuver point, then as the vehicle travels a distance measured according to the velocity signal, the in-vehicle system estimates the vehicle's location as the point that is the measured distance along the sequence of links from the maneuver point. The locations of the nodes at the ends of each link are known to the in-vehicle system, therefore, the in-vehicle system essentially uses the direction of the links to estimate the direction that the vehicle is traveling as it leaves the maneuver point, and as it passes over subsequent links on the route.

Dead reckoning relies on a known correspondence between the velocity signal and the distance traveled. Several factors affect this correspondence, including tire pressure which is affected by temperature, which affects the circumference of the tires. In order to improve the accuracy by which the distance traveled is estimated from the velocity signal, an ongoing calibration procedure is supported. When the in-vehicle system detects a maneuver, it compares the velocity sensor-based distance estimate and the map-based distance estimate. The in-vehicle system adjusts a scale factor relating the number of velocity signal pulses to the distance traveled so that the velocity sensor and map-based traveled distance estimates match.

3.3.3 GPS Location Tracking and Off-Route Detection

While the operator is being directed from maneuver to maneuver along the planned route, the in-vehicle system continuously updates its GPS-based location estimate while the GPS satellite signals are received. In addition, there are intervals during which the in-vehicle system has current GPS correction data that it provides to the GPS receiver in order to improve the accuracy of the GPS-location estimates, for instance, in a differential correction mode.

GPS correction data is received by the in-vehicle system from the server system when the planned route is downloaded. In alternative versions of the system, there may be other times at which the server provides differential correction data, for instance during communication sessions that are established for another purpose.

The in-vehicle system can also compute its own GPS correction data when it knows its location precisely. The in-vehicle system estimates its location very accurately when it detects that a planned maneuver is executed by the operator, since an accurate location of each maneuver is downloaded for the server system when the planned route is downloaded.

Therefore, while negotiating the planned route, the in-vehicle system receives a stream of GPS or DGPS based location estimates. These location estimates are compared on an ongoing basis to the dead reckoning position estimates also maintained by the in-vehicle system.

After a vehicle executes a maneuver, and in particular when GPS correction data is computed based on the location of the maneuver point and the raw GPS data recorded when the vehicle passes through the maneuver point, the GPS-based location and the dead-reckoning positions should match. As a vehicle correctly passes along the planned link, the dead-reckoning position and the GPS-based position are expected to diverge somewhat for several reasons. These reasons include increased error in the GPS estimates, and possible map errors.

The GPS correction data is provided to the GPS receiver for approximately one minute after the maneuver. During that time, their utility slowly decreases, that is, the error of the DGPS based location estimates slowly increases. After the GPS correction data is no longer used, the GPS error is expected to remain within a fixed range.

The error in the dead reckoning position estimate grows primarily due to error in estimating the distance traveled along the links. Also map errors, both in the length of links and the location of waypoints or maneuver points, can contribute to a growing dead reckoning position error.

The combination of a growing error in each of the two terms is compensated for by using an increasing tolerance beyond which an off-route condition is detected by the in-vehicle system. The tolerance starts at 150 feet. The tolerance increases at a rate of 1 foot per 100 feet traveled until the tolerance reaches 500 feet.

If at any point the difference between the two location estimates exceeds the tolerance, the in-vehicle system detects an off-route condition it attempts to correct the dead reckoning position estimate and it that is unsuccessful, it executes a route replanning procedure (see Section 3.4).

3.3.4 Maneuver Notification and Detection

Maneuver notification and detection both use the dead reckoning position estimate, or more particularly, use a dead reckoning estimate of the scalar distance traveled along the planned route from a previously detected maneuver.

The in-vehicle system gives instructions to the operator at distance prior to when the in-vehicle system expects the vehicle to execute the next maneuver. This accounts for both the reaction time needed by the operator, as well as inaccuracy in the system's estimate of the distance to the next maneuver. In order to account for the different amount of time or distance needed by an operator to act on a command, the instructions are given farther from the next maneuver on high-speed links, such as highways, than on small residential streets. Each road class has a fixed distance from an upcoming maneuver at which the next instructions are given.

The in-vehicle system also gives voice prompts as the vehicle enters the notification window. Graphical and text prompts and instructions are displayed at least from the point that the vehicle enters the notification window, and can be displayed sooner.

In a distance-based window around the point at which the in-vehicle system expected the next maneuver to be carried out, the in-vehicle system attempts to detect the exact point at which the maneuver occurs. For instance, if the maneuver involves a right angle turn, the output of the onboard magnetic compass or the GPS-based direction estimate is used to reliably detect the maneuver. Also, sensing of the vehicle speed to detect certain classes of maneuvers, such as stopping at a toll booth.

Certain maneuvers cannot be detected with high accuracy. For instance, a turn may be too gradual to detect using the signal produced by a magnetic compass. If the vehicle leaves the maneuver detection window without detecting the expected maneuver, then the in-vehicle system simply continues to update the dead reckoning position until a subsequent maneuver is detected.

3.3.4.1 Display and Voice Commands

In addition to receiving audible instructions, the maneuver notification and instructions are provided on the in-vehicle display. The display include:

A graphical illustration of the "distance to go" until the next maneuver, or example as a bar chart that gradually fills as the link is traversed, A digital "distance to go," for instance a number in miles or feet, A graphical representation of the upcoming road geometry at the next maneuver, for instance showing the angles at which all roads meeting at the next intersection joint, and Sign text that should be visible at the next maneuver point.

Voice instructions include a variety of pre-stored phrases, including commands to notify a driver of an upcoming maneuver, and commands to instruct and operator to make a maneuver at the point that the instruction is give.

3.4 Route Replanning

When the in-vehicle system detects that a vehicle is off the planned route, it executes a route replanning procedure (FIG. 18). The first step is to determine where the vehicle is traveling on the main road network 1000, which is stored in in-vehicle database 432.

The in-vehicle system uses the GPS (or DGPS) based latitude and longitude estimates to search through the list of nodes in MasterNode table 1310. Sequential GPS-based position estimates, or the output of the magnetic compass, are used to determine a direction of travel along a link joining to adjacent nodes. This then determines which link in LinkSegments table 1330 the vehicle is traveling on, and the direction of travel along that link.

The in-vehicle system then executes a shortest path search (e.g., an A search) starting at that link to one of the maneuver or way points along the planned route. A number of points, or alternatively all points, on either side of the last maneuver point are used as points at which the replanned route can join up with the previously planned route. For instance, ten points before and after the last detected maneuver point can be used. Limiting the number of points can reduce the amount of computation (time and memory) required to replan the route. If there are fewer than ten remaining points, then the actual desired destination is one of the points that the replanned route can "join" to planned route.

As in the server system based route planning approach, the in-vehicle system uses an A algorithm to plan the route. The starting point is determined using the scanning of MasterNode table 1310, as described above. As intermediate nodes are considered in the A search, the lower bound on the distance to the desired location is minimum over the maneuver and way points near the last detected maneuver point of the sum of the straight-line distance from the intermediate point to the maneuver or way point plus the previously calculated distance along the previously planned route from that maneuver or way point to the desired destination. In this way, the best point of rejoining the previously planned route is found.

As in the server system based route planning, the cost of traveling over a link can be based on the length of the link, an estimate of the time to travel over the link based on the road class of the line, or an estimate of the time to travel a link based on specific road speed information associated with that link.

3.5 Floating Vehicle Data Collection

Figure 19:
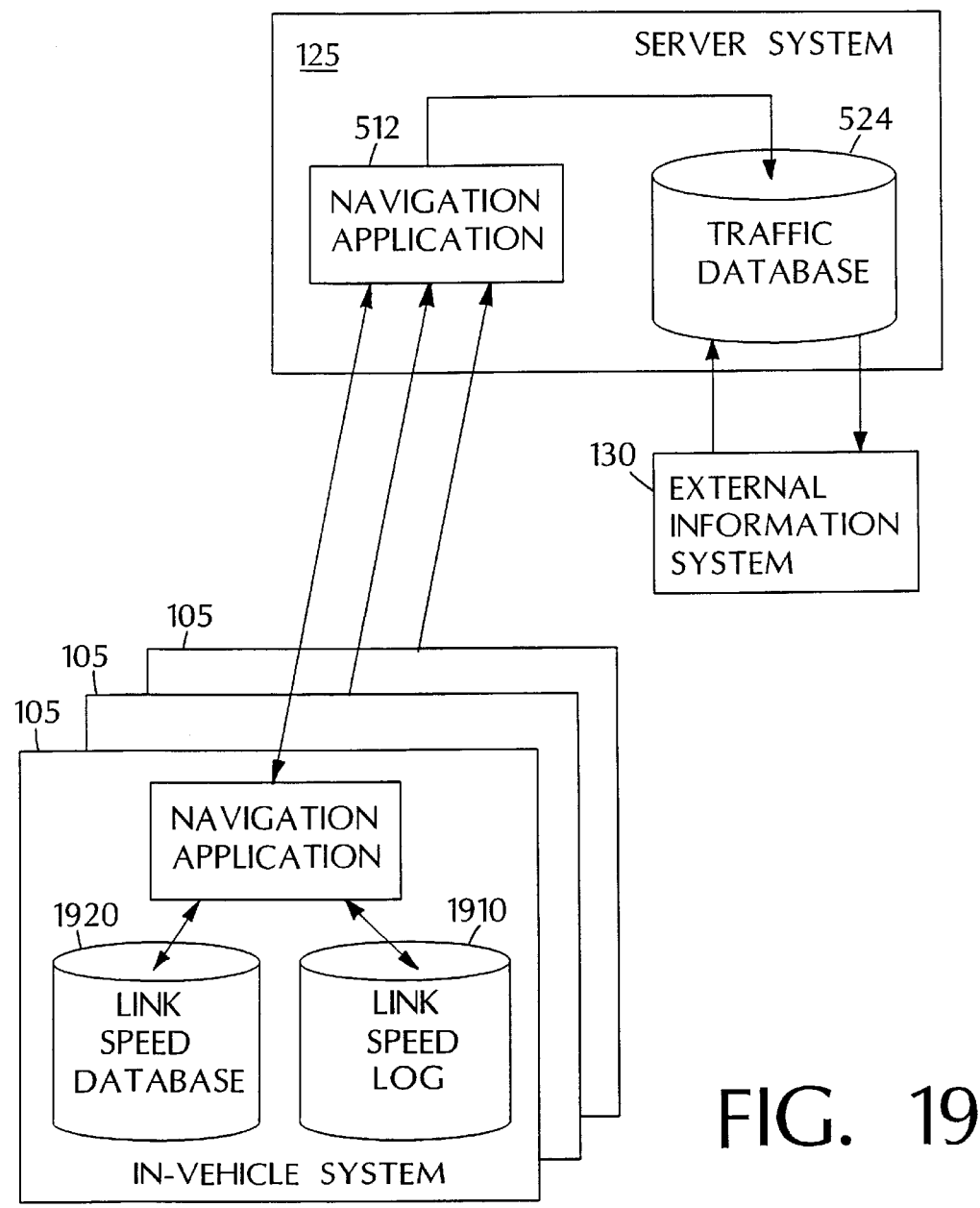
FIG. 19 illustrates a extensible server architecture.

Referring to FIG. 19, navigation application 512 which is part of server system 125 makes use of a traffic database 524 when planning routes that are based on expected travel time. In the description of the system above, traffic information provided from an external information system 130, such as from a government run traffic monitoring authority, is used to populate traffic database 524.

In addition to relying on an externally provided traffic information, server system 125 makes use of some or all vehicles 100 as "probes" for collecting traffic information. Navigation application 512 receives the traffic information from the probe vehicles and feeds the collected traffic information back into traffic database 524 In addition, the server system optionally sends updated traffic information to the external information system. In this way, the vehicle navigation system can be a source of traffic information in addition to, or instead of, being a consumer of traffic information from external information system 130.

Two modes of data collection are used. First, ongoing traffic "profile" data is collected by the in-vehicle systems in probe vehicles. Occasionally, the probe vehicles upload their collected data to the server system and the server system updates its traffic database based on the uploaded information. In the second mode, the in-vehicle systems in the probe vehicles detect when the vehicle's speed is significantly slower than would be expected based on the class of road being traveled, on or based on traffic related data that is stored in the vehicle and which relates the expected speed to the road segment being traveled on. When the in-vehicle system detects that the vehicle's speed is slower that expected, that is, it detects any exception from expected traffic conditions, it immediately reports the exception to the server system so that the server system can update its traffic database 524 to reflects unexpected traffic conditions.

3.5.1 Traffic Profile Collection

In the first mode of traffic data collection, navigation application 412 in in-vehicle system 105 of a probe vehicle collects on an ongoing basis a history (a profile) of the speed that the vehicle travels on links of the main roads network (or equivalently the transit times on the links). The in-vehicle system collects the traffic profile data independently of the guidance function. That is, the vehicle does not have to be guided by the navigation system in order to collect traffic profile data. The navigation application stores the time of day and the speed traveled on each link in a link speed log 1920.

In order to build up link speed log 1920, the in-vehicle system tracks the vehicle's location on main roads network 1000 that is stored in in-vehicle database 432. Using the GPS location estimates it receives from its GPS receiver, the in-vehicle system detects when the vehicle is following a road segment (link) of the main roads network. The in-vehicle system records the time the vehicle takes to travel from one end to the other of the link and stores a reference to the link, the time of day, and the speed traveled along the link in the link speed log. As the vehicle travels over multiple links of the main roads network, a series of travel times is logged, each associated with a link that was traversed.

Occasionally, for example when vehicle leaves the main roads network, or periodically, such as daily, the in-vehicle system sends the logged profile information it has stored in link speed log 1920 to the server system over a data connection that the in-vehicle system initiates over a cellular telephone connection with the server system. After it has sent the information, the in-vehicle system clears its link speed log.

The operator of the vehicle has the option of enabling or disabling either mode of data collection through the user interface of the in-vehicle system. Also, the server system can enable (or request) either type of collection. For instance, the server system can enable more vehicles if it needs more data, and disable data collection in some vehicles if it is receiving more data than it needs.

At the server system, navigation application 512 receives the logged speed information from a number of probe vehicles. Using this collected information, the navigation application updates traffic database 524. For example, the navigation application incorporates the reported speeds for a particular link into an average speed for that link that is stored in its traffic database. Optionally, the server system provides the updated traffic information to external information system 130.

On the server system, traffic database 524 includes an average link speed for each link (in each direction), as well as a start and a stop time for a morning and an evening rush "hour" (busy period). For each busy period, the traffic database includes the average speed during that period.

Various alternative intervals can be used. For instance, equal five-minute intervals can be used, as can unequal intervals, such as 1 hour intervals in the middle of the night and five-minute intervals at typically busy periods.

Optionally, the average link speeds stored in the server system's traffic database 524 are downloaded and stored in a link speeds database 1910 in the in-vehicle system of each vehicle. This link speeds database is used, for instance, by the in-vehicle system when replanning a route bases on a shortest expected travel time.

3.5.2 Exception Reporting

In the second mode of traffic data collection, the in-vehicle system makes use of information in its link speeds database 1910, which includes expected travel speeds for all the links in main roads network 100. Multiple travel times are stored for each link, for instance, to account for the variations due to morning and evening busy periods. For each link, the following information is recorded:

Typical expected speed

Start and end times of the morning busy period

Expected speed during the morning busy period

Start and end times of the evening busy period

Expected speed during the evening busy period

Alternatively, other types of intervals can be used to store the speed information. Also, rather than relying on specific speed information for a link, the in-vehicle system can alternatively base the typical expected speed for a link on the class of the link. For instance, a link on a class 4 (highway) link can be typically expected to be close to the speed limit (e.g., 55 MPH).

As in the profile data collection mode, the in-vehicle system of a probe vehicle tracks the location of the vehicle using GPS location estimates as it traverses links of the main roads network, and detects when the vehicle traverses particular links in the main roads network. The in-vehicle system detects that a traffic exception has occurred if a travel speed along a link is substantially slower or faster than expected (e.g. 75% of the expected speed or slower) for that link at that time of day.

When a traffic exception occurs, the in-vehicle system establishes a communication session with the server system by placing a cellular telephone call to the server system. The in-vehicle system transmits a short data message encoding the exception, identifying the link and the travel speed, to the server system.

In an alternative approach to exception reporting, a vehicle makes a probabilistic choice of whether to transmit the exception message. In this alternative, not all vehicles which encounter the exception transmit to the server system, thereby reducing the communication load on the server system The server system receives the exception message from the in-vehicle system. The server system updates traffic database 524, which it uses to plan routes, based on the exception messages it receives from the probe vehicles. If there is a sufficient "density" of probe vehicles on the road network, the server system will typically receive exception messages from multiple probe vehicle. Therefore, optionally, the server system can require that two or more probe vehicles report an exception (i.e., a traffic exception is confirmed by another vehicle) before updating its traffic database.

The server system resets its expected speeds for the links on which exceptions have been reported after a period of time when no more exceptions are reported by probe vehicles for those links.

Operation of the exception data collection mode does not necessarily require intervention of the operator. The operator of a probe vehicle can explicitly enable or disable exception reporting. Also, the in-vehicle system can be configured so that the operator is asked to confirm the validity of exception information before it is sent to the server system. For instance the in-vehicle system can display the exception message to the operator and the operator must press a button indicating that the message is valid before it is sent to the server system. This confirmation approach avoids having a vehicle report an exception when slow speed is due to a non-traffic related reason, such as stopping for gas along the link.

In a alternative version of the system, exceptions are logged rather than immediately reported to the server system. The in-vehicle system then uploads the logged exceptions to the server system in the same way that it can upload logged profile data.

3.6 Server Control

In an alternative version of the system, the system controls the vehicle data collection, for instance, to limit the rate at which it receives data from probe vehicles, or to receive data related to particular regions or roadways. Alternative methods of controlling the collection include the following.

In a first alternative, the probe vehicles do not transmit their logged speed data unless queried by the server system. The server system polls (interrogates) vehicles to receive their logged speed data. In one approach, the server system polls vehicles based on the geographic region in which the vehicles typically travel. For instance, if the server system does not have up-to-date data for roads in a region, it polls vehicles that typically travel in that region. To poll a vehicle, the server system places a cellular telephone call, or otherwise notifies the vehicle, the in-vehicle system. The in-vehicle system receives the call and provides its logged speed data to the server. For example, an alternative to placing a telephone call is to broadcast a message to a number of vehicles over a broadcast channel, such as on a sideband of a commercial radio broadcast. In another approach to this alternative, the server system polls vehicles for which it has recently provided planned routes and which it expects will have logged speed data for road segments on those routes.

In another alternative, the in-vehicle systems place the calls to the server system to transfer logged speed data, but the server system has previously provided instructions to the in-vehicle system regarding when to initiate that call. For instance, when the server system provides a planned route to the in-vehicle system, the planned route is accompanied by an instruction to call the server system after the vehicle has passed a particular road segment.

In another alternative, whenever an in-vehicle system calls the server system, the server system optionally requests the vehicle's logged speed data. In the case that the vehicle is calling for a route planning service, the data transfer occurs during the interval between the upload of the desired destination and the start of the download of the planned route, or in any other interval that would have otherwise been unused for data transfer from the vehicle to the server system.

In another alternative, when the server system provides a planned route to an in-vehicle system, the planned route includes the server system's up-to-date expected link times (i.e., the link times reflect recently received probe data). In this alternative, traffic exceptions on a segment are not reported to the server if the server system was already aware of the exception at the time that it planned the route.

3.7 Data Fusion

In alternative versions of the system, the server system receives traffic related information from external information services. For instance, the server system receives traffic incident reports (e.g., breakdown reports) that it uses to predict slow travel speeds, rather than waiting to receive data from probe vehicles for those segments. Similarly, the server system receives information related to events (e.g., sporting events) that it uses to predict link speeds. The server system combines these predicted link speeds with link speeds reported by probe vehicles when calculating new routes for in-vehicle systems according to as shortest expected travel time criterion.

Figure 20A:
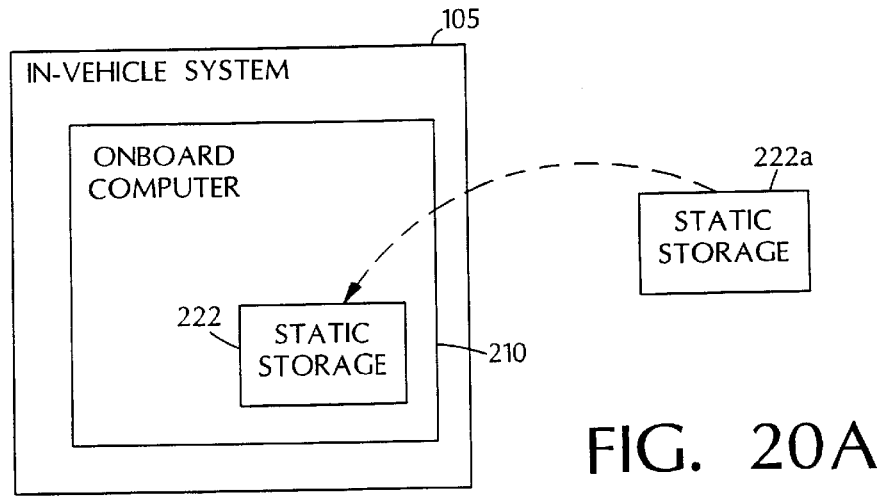
FIGS. 20A–20C illustrate approaches to updating an in-vehicle system.
Figure 20B:
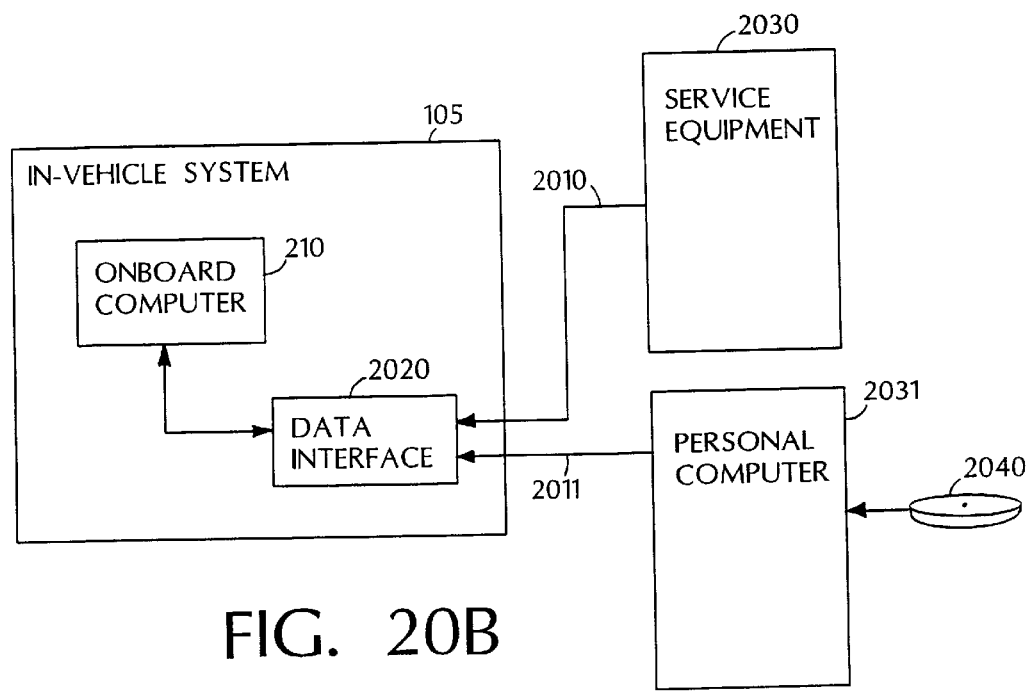
Figure 20C:
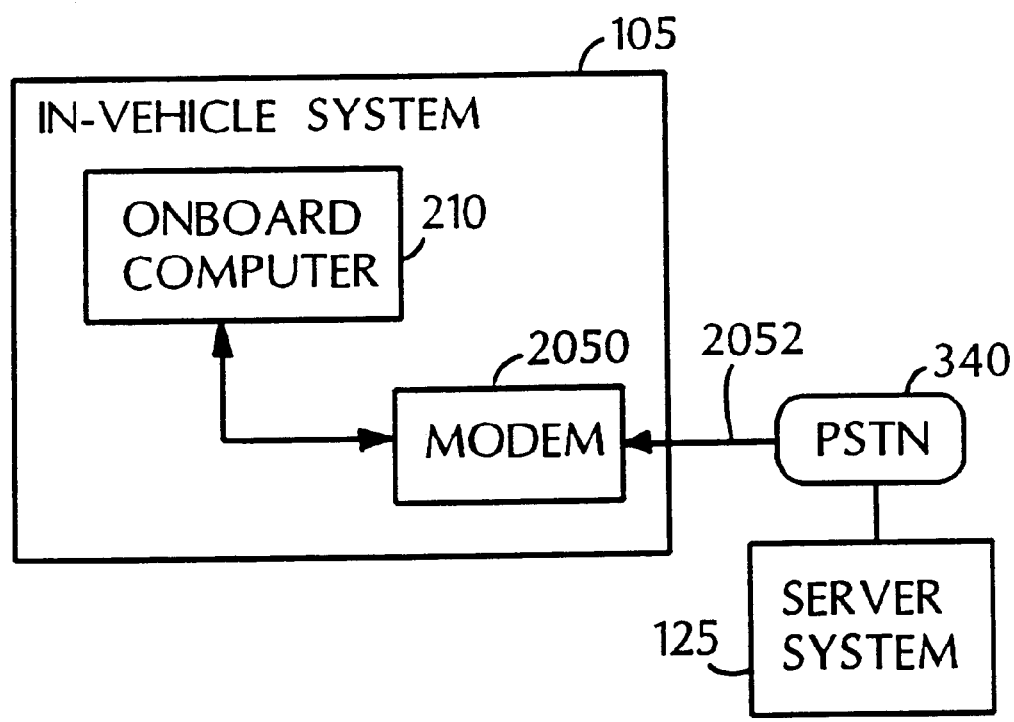

4 Vehicle Updating (FIGS. 20A–C)

In the system described above, in-vehicle system and the server system include data that is kept consistent. For instance, the main roads network stored in the in-vehicle system includes a subset of the roads network on the server system. When the data is consistent, a destination specification that is validated by the in-vehicle system will be valid for the server system as well.

The information used by the overall navigation system is updated from time to time. For example, the map provider may provide periodic updates to the road network to correct previous errors or to reflect changes in the road network, such as addition of a new road.

Alternative versions of the system use one or more approaches to updating the in-vehicle system to keep the in-vehicle and system databases consistent. When the databases are consistent a destination specification that is validated by an in-vehicle system will not be found to be invalid by the server system when it tries to plan a route to the destination. Conversely, when the databases are consistent, the in-vehicle will not rule out a destination specification that the server system would have found to be valid, for example because a new road has been added to the road network.

The system also includes the provision to update the software in addition to the data for the in-vehicle system. For instance, the user interface for existing functionality can be changed by downloading new code. Also, entirely new functionality can be downloaded. This new or changed functionality can include modified menus and graphics that are used to interface with the operator.

New software and interface definitions are integrated into the in-vehicle system using one of several well-known alternative techniques. For example, new software modules can provide predefined entry points that are accessed from existing software modules in the in-vehicle system. Data describing the interfaces to new software modules can be downloaded with the code that implements the modules. User interface definitions can be implemented using low-level code that manipulates the pixels on the display, or can use a high-level description such as one using a markup language (e.g., HDML).

The navigation system uses one or more of the following alternative approaches to updating the in-vehicle system:

Physically replacing a static storage device in the in-vehicle system,

Updating over a high-speed data link, for example at a dealership or other service center, and Updating over a cellular telephone based data link.

Each of these approaches are described in the following sections.

4.1 Physical Replacement of the Storage Device

Referring to FIG. 20A, in a first approach, static storage 222 in onboard computer 210 in in-vehicle system 105 is a removable device. For instance, static storage 222 can be a PCMCIA card housing a magnetic disk or a flash memory system.

Updating the in-vehicle system involves replacing storage device 222 with another storage device 222a that has been preloaded with an updated version of the databases. This enables the entire database to be updated quickly, for instance, when the main roads network needs to be updated to correspond to a different geographic area.

4.2 Updating Over a High Speed Data Link

Referring to FIG. 22B, a second approach to updating the in-vehicle system involves transferring data to the in-vehicle system over a high-speed (e.g., up to 1 Mb/s) data connection. The in-vehicle system includes a data interface 2020 that is connected to onboard computer 210 in in-vehicle system 105. A source of the update data is connected to the data interface. For instance, a high-speed connection 2010 can be connected to service equipment 2030 at a dealership or a service center which downloads the updated information using industry standard communication protocols, such as Ford's SCP or the SAE J1850 protocol. Alternatively, an owner of a vehicle can connect a personal computer 2031 (such as a laptop computer) to the in-vehicle system. Updates for the in-vehicle system would be obtained by the owner on a recorded medium 2040, such as a CD-ROM, or over the Internet. Connection 2011 between the personal computer and the in-vehicle system can use a wireless connection, such as an infrared link.

Referring to FIG. 20C, another alternative approach to updating the in-vehicle system is to use a wired telephone connection. In this approach, the in-vehicle system includes a moderate speed modem 2050 (e.g., a 56 kb/s modem) and a telephone connector. The owner provides a physical connection 2052 from the telephone connector to the public telephone network (PSTN) 340. The in-vehicle system places a telephone call to the server system, or another server used to provide data updates, and downloads the data at a moderate speed over the telephone connection.

4.3 Updating Over a Wireless Link

A third approach to updating the in-vehicle database uses a wireless data connections between the in-vehicle system and the server system, such as over a cellular telephone connection. The amount of data that can be transmitted in a reasonable time (e.g., less than an hour) is limited by the relatively slow data transfer speeds that can be achieved over such connections. Typically, the database is incrementally updated over a wireless data connection rather than an entire new copy of the database being downloaded.

One of several alternative approaches to initiating a database update over a wireless data connection with the server system are used. First, an operator can explicitly request an update through the user interface of the in-vehicle system. Second, an update can be requested by an in-vehicle system based on an elapsed time since a prior update. Third, database edits can be downloaded prior to or after downloading a planned route after the in-vehicle system establishes a communication session with the server system. Fourth, the server system can place telephone calls to each of the vehicles and "push" the edit updates to each vehicle in turn.

In order to maintain consistency between the in-vehicle data and the server system's data, data in the database is associated with a version number. Each time the server system updates its data, it updates the version number. When a vehicle requests a route, it also provides the version number of the data that was used to validate the destination specification of the route. The server system uses the received version number to identify which, if any, updates have not yet been downloaded to the calling vehicle.

The server does not necessarily have to download all updates in one session. Instead, it provides updates incrementally. In the incremental approach, the most relevant updates are provided first. For instance, the server system updates the main roads network in the city in which the vehicle typically travels prior to downloading updates for another city.

If an in-vehicle system has an out-of-date database, the validated destination specification that it sends the server system may be invalid due to changes in the road network. For instance, a street name may have changed. Therefore, if the server system receives an invalid destination specification from the in-vehicle system, the server system notifies the in-vehicle system which notifies the operator. The operator can then specify another address, or wait for updated information to be downloaded to the vehicle from the server system.

5 Additional Services

In addition to providing navigation services, alternative versions of the vehicle information system provide additional services such as roadside assistance, remote vehicle control, traffic information, and communication related services.

5.1 Emergency and Roadside Assistance

Figure 21A:
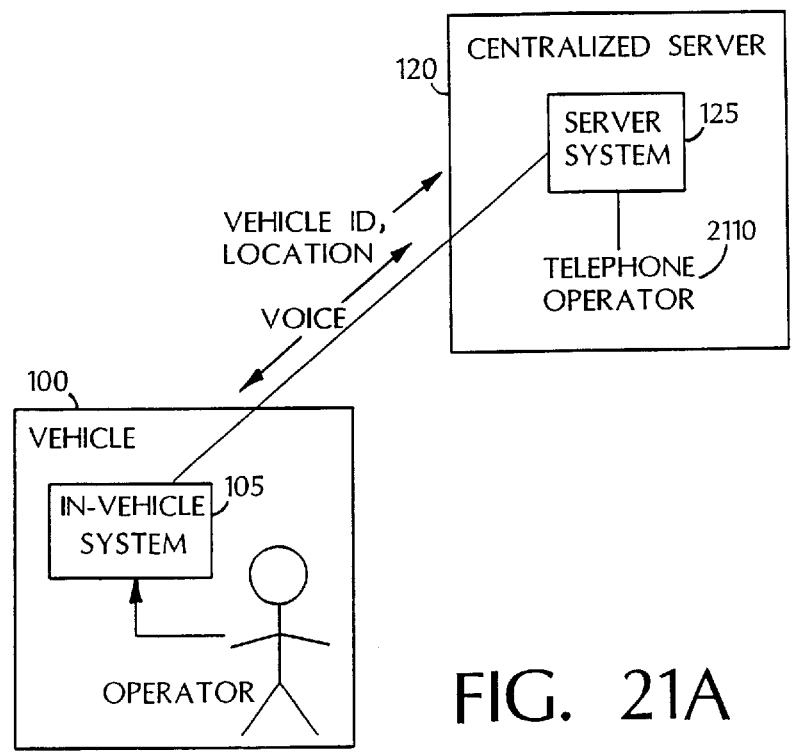
FIGS. 21A–21B illustrate additional information services provided by a server system.

Emergency and roadside assistance provides an operator of a vehicle with a way of contacting assistance and providing the location of the vehicle. Referring to FIG. 21A, in an operator initiated interaction, the operator selects the emergency and roadside assistance option on the user interface of the in-vehicle system. The vehicle places a cellular telephone call to the server system, or to another server that the in-vehicle system has been configured to call to handle such requests. When the call is established, the in-vehicle system establishes a data connection to the called server. The in-vehicle system transfers a unique identification of the vehicle to the server. The unique identification is used by the server to access information such as the make, model, and color of the vehicle, which may be useful to a dispatched service vehicle finding the operator's vehicle. The in-vehicle system also sends its estimated location, or raw GPS data, and most recent direction of travel based on its GPS measurements. The server system applies GPS correction data to the vehicle's estimated location or raw GPS data to determine a corrected location estimate. After the in-vehicle system transfers the data to the server, the operator can communicate with a telephone operator 2110 at the server using the telephone handset in the vehicle. This allows the operator to provide details that may be useful in dispatching assistance.

In addition to operator-initiated requests for assistance, the in-vehicle system includes a mode in which activation of the air-bag system, or some other indication of an emergency situation, automatically initiates a request for assistance. This mode would be used, for example, if the vehicle is involved in a collision and the operator is unable to or does not think to call for assistance.

5.2 Remote Vehicle Control

Another additional service is remote vehicle control. The in-vehicle system is coupled to vehicle subsystems, such as the door locking subsystem, or the vehicle control subsystem. This coupling can use standard vehicle data communication infrastructure found in many vehicles today, such as the SCP (the Standard Corporate Protocol) bus found in vehicles manufactured by the Ford Motor Company.

5.2.1 Door Unlocking

Figure 21B:
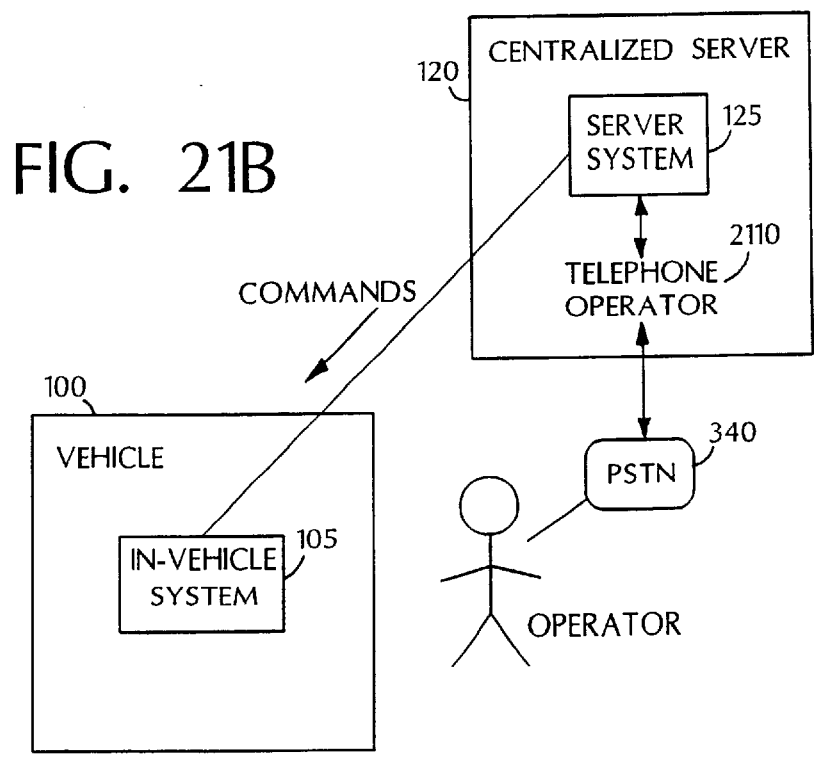

Referring to FIG. 21B, remote door unlocking is an example of a remote vehicle control service. When an operator is locked out of his or her car, he or she contacts the server system, for example, by placing a telephone call to a telephone operator with access to the server system. After appropriate authentication by the telephone operator, the telephone operator initiates a remote door unlocking procedure that is executed by the server system.

The vehicle's cellular telephone receiver is not typically left on when the operator has left the vehicle in order to reduce battery usage. Therefore, the server system does not, in general, simply make a telephone call to the in-vehicle system to unlock the doors.

On a precise schedule, the in-vehicle system repeatedly powers up the cellular telephone receiver to determine whether an incoming call is being placed at that time. For instance, the in-vehicle system repeats this cycle every 15 minutes. If the in-vehicle system does not detect a call, it powers down the telephone receiver until the next scheduled listening time.

The vehicle's schedule is stored at the server system, and the in-vehicle system and the server system share a common time base, for example based on GPS signals. The server system waits until the locked vehicle's next scheduled listening time to make a cellular telephone call to establish a data communication channel with the in-vehicle system. Once a data connection is established, the server system sends a command to the in-vehicle system to unlock the doors.

When the operator of the vehicle requests the door unlocking service from the telephone operator, the telephone operator informs the vehicle operator of the time that the doors will be unlocked, since the schedule of vehicle listening times is available to the telephone operator.

5.2.2 Vehicle Immobilization

A vehicle immobilization service uses a similar strategy as the door unlocking service. A vehicle operator calls a telephone operator at the centralized server to notify the telephone operator that the vehicle has been stolen. The server system can either make a telephone call to the in-vehicle system immediately, if the telephone receiver in the vehicle is powered on, or relies on the scheduled power-up mode that is used for the door unlocking functionality described above.

In either case, when the in-vehicle system and the server system communicate, the in-vehicle system provides the vehicle's location to the server system, and the server system provides to the in-vehicle system a command to disable the vehicle. The in-vehicle system then sends a command to a vehicle system to disable the vehicle.

5.3 Traffic Information

The traffic information service provides an operator with a report of traffic conditions on a small set of previously specified "trips." For instance, an operator may have a choice of three alternative ways of getting go from home to work. When the operator is about to begin the trip, he or she interacts with the in-vehicle system to request traffic information on those trips. The in-vehicle system contacts the server system, which provides current traffic information for the operator's trips.

One approach by which the operator specifies his or her "trips" uses an onboard stored table of a set of trip segments. These segments would typically involve many segments of the road network. For instance, a portion of a major highway between two intersecting highways might be trip segment. The operator "builds" the personal trips by choosing a subset of trip segments. When the in-vehicle system contacts the server system to determine traffic conditions on the operator's personal trips, the in-vehicle system transfers the operator's selected trip segments to the server system.

The server system uses its traffic database, which include current link speeds on segments of the road network, to determine the current traffic conditions on the operator's trips. Various alternative presentations of the traffic conditions can be used. In this version of the system, the traffic conditions are categorized into a small number of categories, such as normal, congested, and severely congested, and each category is displayed graphically to the operator using a different icon.

In alternative versions of the system, the server system actively contacts a user if an exceptional traffic condition occurs on one of the user's previously specified trips. For instance, the server system can send the information to the in-vehicle system by calling the in-vehicle system, or send a pager message, send email, or place a telephone call to the user informing the user of the exceptional condition.

In another alternative, the user specifies several alternative trips. When the server system detects an exceptional traffic condition on one of the user's specified trips, it actively downloads traffic information related to the alternative trips. In this way, the user does not have to wait for the in-vehicle system to make a call to the server system to replan the route.

Figure 22:
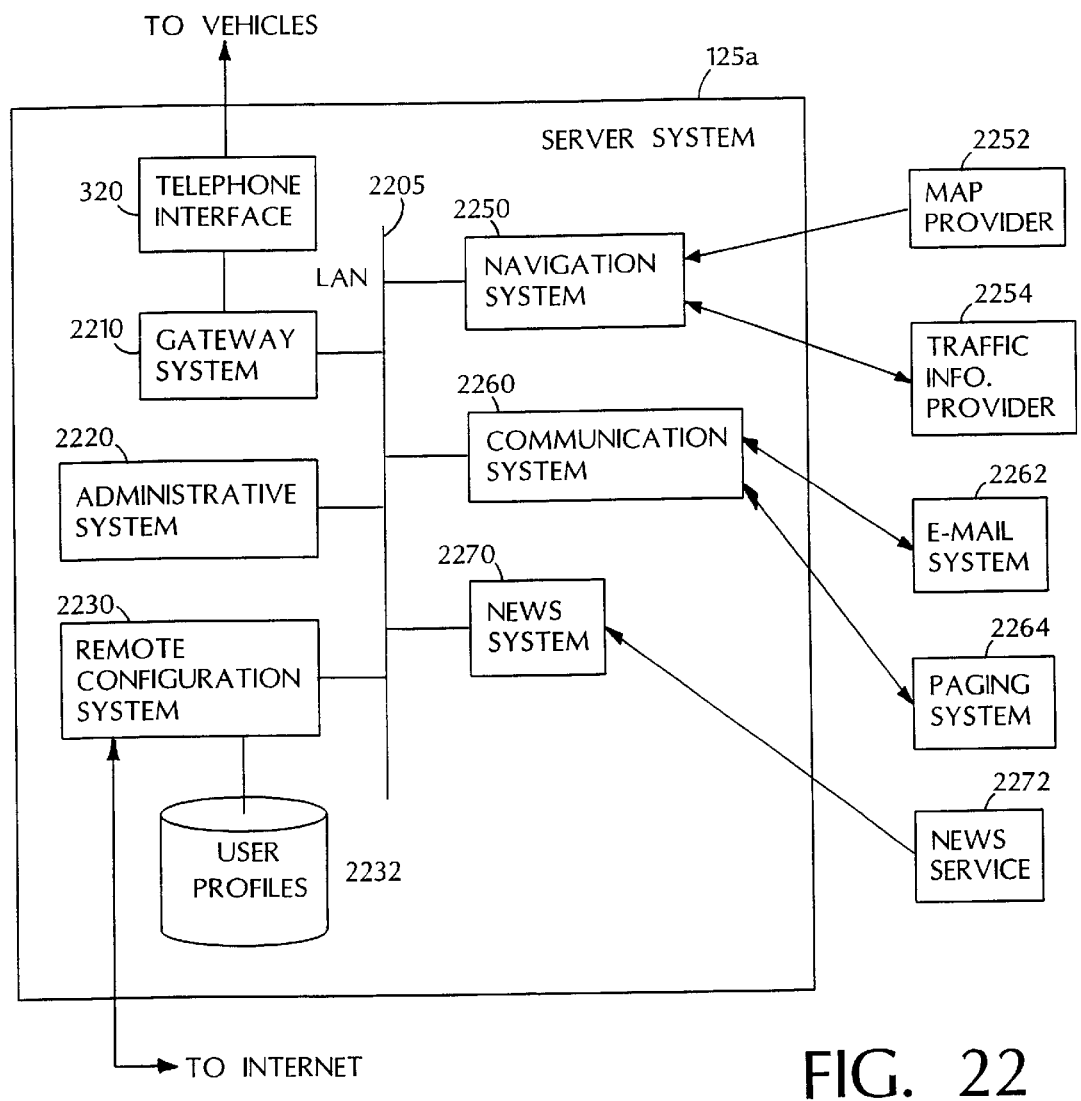
FIG. 22 is a block diagram of an extensible server system.

6 Extensible Server Architecture (FIG. 22)

Referring to FIG. 22, an alternative server system 125a provides the functionality of the server system 125 described above, and in addition provides an extensible architecture for providing other services to the vehicles. Server system 125a includes multiple server computers coupled over a LAN 2205. Alternatively, the functionality of these server computers can be implemented on a smaller number of computers, or on a single computer that implements all their functions.

Server system 125a includes a gateway system 2210 that is coupled to telephone interface 320. Gateway system 2210 is used to provide a communication gateway between vehicles 100 and server computers in server system 125a, and implements a message routing function so that communication received from an in-vehicle system is directed to the appropriate server computer. Gateway system 2210 does not necessarily have to interpret the content of data passing between the server systems and the vehicles.

The server computers include a navigation system 2250 on which the navigation application described above executes. When an in-vehicle system initiates a communication session with server system 125a to request a route planning service, gateway system 2210 determines that the session should be connected to navigation system 2250 using information provided by the in-vehicle system in the communication session. For instance, the in-vehicle system identifies the navigation service in the initial portion of the data stream. Alternatively, different services implemented by server system 125a have different telephone numbers that are assigned to telephone interface 320, and gateway system 2210 routes the communication to the appropriate server computer based on the number called by the in-vehicle system.

Navigation system 2250 implements the functionality of server system 125 as shown in FIG. 5. That is, it includes an interface to GPS receiver 325, and includes server map database 520, yellow pages database 522, and traffic database 524. Navigation system 2250 is coupled to map provider 2252, and a traffic information system 2254.

Another service provided by server system 125a is implemented by a communication system 2260. Communication system 2260 is coupled to external communication systems, including an email system 2262 and a paging system 2264. These external communication systems forward messages addressed to particular vehicles to communication system 2260. Communication system 2260 requests from gateway system 2210 that a data communication channel be established with the particular vehicles, and then passes data and commands to the in-vehicle systems.

The in-vehicle systems in the vehicles include software modules that correspond to the services provided by the server system. For instance, communication sent from communication system 2260 to an in-vehicle system is received by a communication module that interprets the data and commands it receives. For instance, a message communication module displays paging or email messages on the display of the in-vehicle system, or alternatively plays them as synthesized speech messages.

A news system 2270 provides a service which sends data to vehicles which corresponds to news stories that are of interest to a particular vehicle operators. The news stories are provided by an external news service 2272.

Server system 125a also includes a remote configuration system 2230 that is coupled to LAN 2205, and that is also coupled to the Internet. Using the remote configuration system, users of the navigation system can modify their records in user profiles 2232 that are stored at the server system. A user's profile is downloaded by the server system to the in-vehicle system in that user's vehicle, or can alternatively be stored on the server system. Information in the user profiles can include various types of information, including stored destinations that the user can select from when specifying a destination to the in-vehicle system. For instance, a user can specify a list of frequent destinations over the Internet, and then later in the vehicle choose a particular destination in that list by selecting from a display of the list by the in-vehicle system.

Another aspect of the user's profile relates to the traffic information service. Rather than having to define a set of trips using the in-vehicle interface, the user selects trips using a graphical map-based interface. For instance, an entire map of the highway system or the main roads network is displayed. The user selects paths on the graph by selecting sequences of trip segments. These trips are downloaded to the user's vehicle, or can be stored by the server system. If they are stored at the server system, when the user initiates a traffic information request in the vehicle, the in-vehicle system does not necessarily transfer the specifications of the operator's trips, rather it specifies the identity of the operator and the server system looks up the operator's stored trips.

A user's profile can also include preferences such as particular roads the user wants to avoid. The user's profile can alternatively include a time saving above which the user is willing to use a road that he or she otherwise wants to avoid.

A user also uses remote configuration system 2230 to input route planning requests. For instance, the user provides a destination specification to the remote configuration system and the server system downloads a planned route to the destination prior to the user entering the vehicle. The user can access the remote configuration system in a variety of ways, including over the Internet, and over a voice telephone connection interacting with an automatic speech recognition device at the server. In addition to specifying a destination, the user can also request notification of when he or she needs to start the trip in order to get to the destination at a particular time. The notification can be by telephone, pager, or using any of a variety of other notification methods.

A new service is added to server system 125a by adding a server computer, updating gateway system 2210 so that communication for that service is routed to the new server computer, and updating the in-vehicle system by adding a corresponding software module to each of the in-vehicle systems. The in-vehicle systems are updated either over a cellular telephone connection, or over a physical connection, as described above (see Section 4).

Alternative version of the system do not necessarily include all the features described above. For instance, a traffic information system can include operator specified trips. The in-vehicle system contacts a server system for traffic information for those trips. The in-vehicle system does not need a GPS receiver, or a map database, of other features to support this feature alone.

In another alternative, the in-vehicle system does not necessarily support autonomous route replanning. The in-vehicle system can contact the server to replan the route, or to provide a map which it uses to replan the route, when the in-vehicle system detects that the vehicle has gone off-route.

An alternative version of the system provides a "detour" capability. In particular, an operator indicates a road segment that should be removed from a planned route, and the in-vehicle system plans a detour around that road segment using its main roads database.

In another alternative version of the system, the server system plans and downloads several routes, for instance planned according to different criteria, such as shortest time, shortest distance, etc. The in-vehicle system displays characteristics of the alternatives (e.g., time, distance) and the operator selects one. If the server have not yet downloaded al the routes, only the selected route is continued to be downloaded.

In another alternative version of the system, additional data is downloaded from the server system along with the route. For instance traffic information is downloaded and displayed to the operator. Also, advertising information, for example, for restaurants along the route are downloaded and displayed to the operator and the vehicle passes along the route.

In another alternative, traffic information is downloaded to the vehicle, for instance, according to a set of trips that have been specified by the operator. The traffic information is displayed along with a map of the road network. Traffic information is indicated using one of a variety of techniques, including text annotations, icons, or using color.

In another alternative, the server system does not download spot maps to the in-vehicle system. The in-vehicle system provides turn-by-turn instructions from the starting locations. For instance, the first instruction may be "proceed to street X," accompanied by an arrow indicating the direction the street X.

In another alternative, the in-vehicle system has a main roads network for autonomous replanning, but does not include address-range data for validating street addresses. The in-vehicle system instead relies on the server system to validate the street number specified by an operator. In this way, the in-vehicle system validates and address partially and relies on the server system completing the validation.

The same server system can concurrently support in-vehicle systems with different capabilities, such as the alternative capabilities described above.

Another alternative version enables an operator to specify a sequence of destinations. For example, the first destination can be a gas station, and the second destination is the operator's work. All the destinations in the sequence are validated before the in-vehicle system contacts the server system. The server system plans a route from the starting location to the first destination, and then from one destination to the next. The server system downloads the entire planned route to the in-vehicle system.

It is to be understood that the foregoing description is intended to illustrate and not to limit the scope of the invention, which is defined by the scope of the appended claims. Other embodiments are within the scope of the following claims.

What is claimed is:

1. A method for retrieving information at a mobile system comprising:

providing a mobile database in the mobile system for storing information related to validity of location specifications;

accepting a location specification from a user of the mobile system;

determining if the accepted location specification is valid, including validating the location specification by accessing data from the mobile database; and if the accepted location specification is valid,
transmitting the validated location specification in an information request sent from the mobile system to a server system, and
receiving at the mobile system from the server system information related to the location specification sent to the server system.

2. The method of claim 1 further comprising establishing a wireless communication session between the mobile system and the server system for transmitting and receiving data between said systems.

3. The method of claim 2 wherein establishing the communication session occurs after validating the location specification and before transmitting the validated specification to the server system.

4. The method of claim 3 further comprising terminating the communication session after receiving the information related to the location specification.

5. The method of claim 1 wherein:

determining if the location specification is valid includes determining a specification of a destination location; and receiving the information related to the location specification includes receiving data characterizing a route through a road network to the destination location.

6. The method of claim 5 further comprising, at the server system, computing the route through the road network.

7. The method of claim 6 wherein computing the route includes accessing data in a server database related to available routes through the road network.

8. The method of claim 5 wherein mobile system does not include data sufficient to compute the route through the road network.

9. The method of claim 8 wherein validating the location specification using data from the mobile database includes determining whether the server system includes data sufficient to compute the route to the specified location.

10. The method of claim 9 further comprising receiving data from the server system to update the mobile database to maintain consistent with data in the mobile database and at the server system for computing routes.

11. The method of claim 1, wherein:

providing the mobile database includes providing data related to validity of address numbers for each of a plurality of streets;

accepting the location specification includes accepting a specification of a street and accepting an address number; and validating the location specification includes determining whether the accepted address number is valid using the accessed data related to the validity of address numbers for the specified street.

12. The method of claim 11 wherein:

providing data related to validity of address numbers includes providing data specifying a valid range of numbers; and determining whether the accepted address number is valid includes determining whether said address number is the valid range of numbers.

13. The method of claim 1 wherein:

providing the mobile database includes providing data related to validity of address numbers includes providing data characterizing a plurality of valid streets;

accepting the location specification includes accepting a specification of a street; and validating the location specification includes determining whether the accepted specification of the street corresponds to one of the plurality of valid streets.

14. The method of claim 1 wherein:

providing the mobile database includes providing data characterizing pairs of intersecting street;

accepting the location specification includes accepting specifications of each of a pair of streets; and validating the location specification includes determining whether the accepted specifications of the pair of streets corresponds to one of the pairs of intersecting streets.

15. The method of claim 14 wherein one or both of the specifications of the pairs of streets ambiguously identify multiple streets, and wherein validating the location specification includes determining whether any of the pairs taken from the multiple streets corresponds to one of the pairs of intersecting streets.

16. The method of claim 15 wherein at least one of the specifications that ambiguously identifies multiple streets specifies a street name and the multiple streets include streets in different localities with the same street name.

17. The method of claim 15 wherein accepting the location specification includes presenting to the user identifications of multiple of the pairs of intersecting streets that correspond to the accepted specifications of pairs of streets, and accepting a selection from the user of one of the presented pairs of intersecting streets.

18. Software stored on a computer readable medium comprising instructions for causing a computer to perform functions comprising:

accessing a mobile database in a mobile system related to validity of location specifications;

accepting a location specification from a user of the mobile system;

determining if the accepted location specification is valid, including validating the location specification using data from the mobile database; and if the accepted location specification is valid, transmitting the validated location specification in an information request sent from the mobile system to a server system, and receiving at the mobile system from the server system information related to the location specification sent to the server system.

19. A method for retrieving information at a mobile system comprising:

providing a mobile database in the mobile system related to validity of location specifications, including providing data characterizing a plurality of categories of destinations;

accepting from a user of the mobile system a selected category from the plurality of categories;

transmitting the selected category from the mobile system to a server system;

receiving at the mobile system from the server data characterizing a plurality of locations associated with the destinations from the selected category;

accepting from the user a specification of one of the plurality of locations;

transmitting an identification of the accepted location specification from the mobile system to the server system, and receiving at the mobile system from the server system information related to the location specification sent to the server system.

20. Software stored on a computer readable medium comprising instructions for causing a computer to perform functions comprising:

accessing a mobile database in a mobile system for storing information related to validity of location specifications, including providing data characterizing a plurality of categories of destinations;

accepting from a user of the mobile system a selected category from the plurality of categories;

transmitting the selected category from the mobile system to a server system;

receiving at the mobile system from the server data characterizing a plurality of locations associated with the destinations from the selected category;

accepting from the user a specification of one of the plurality of locations;

transmitting an identification of the accepted location specification from the mobile system to the server system, and receiving at the mobile system from the server system information related to the location specification sent to the server system.

21. A system for retrieving information at a mobile system comprising:

a mobile database in the mobile system for storing information related to validity of location specifications, including providing data characterizing a plurality of categories of destinations;

means for accepting from a user of the mobile system a selected category from the plurality of categories;

means for transmitting the selected category from the mobile system to a server system;

means for receiving at the mobile system from the server data characterizing a plurality of locations associated with the destinations from the selected category;

means for accepting from the user a specification of one of the plurality of locations;

means for transmitting an identification of the accepted location specification from the mobile system to the server system, and means for receiving at the mobile system from the server system information related to the location specification sent to the server system.

* * * * *